United States Patent
Dreyer et al.

(10) Patent No.: US 7,188,637 B2
(45) Date of Patent: Mar. 13, 2007

(54) METHODS, SYSTEMS, AND ARTICLES FOR CONTROLLING A FLUID BLENDING SYSTEM

(75) Inventors: Rudolf Petri Dreyer, Fourways (ZA); Gerhardus Dirk Kotze, Vaalpark (ZA)

(73) Assignee: Aspen Technology, Inc., Cambridge, MA (US)

(*) Notice: Subject to any disclaimer, the term of this patent is extended or adjusted under 35 U.S.C. 154(b) by 316 days.

(21) Appl. No.: 10/837,510

(22) Filed: Apr. 30, 2004

(65) Prior Publication Data

US 2004/0221889 A1    Nov. 11, 2004

Related U.S. Application Data

(60) Provisional application No. 60/467,208, filed on May 1, 2003.

(51) Int. Cl.
*G05D 11/035* (2006.01)

(52) U.S. Cl. .......................................... 137/6; 137/88

(58) Field of Classification Search ................ 137/6, 137/93, 88

See application file for complete search history.

(56) References Cited

U.S. PATENT DOCUMENTS

| | | | | |
|---|---|---|---|---|
| 2,608,199 A | * | 8/1952 | Schmidt et al. | 137/6 |
| 3,734,675 A | * | 5/1973 | Osburn | 431/12 |
| 5,979,705 A | | 11/1999 | Kaehler et al. | |
| 6,006,775 A | * | 12/1999 | Negley, III | 137/93 |
| 6,065,638 A | | 5/2000 | Terranova et al. | |
| 6,533,449 B1 | | 3/2003 | Auad | |

FOREIGN PATENT DOCUMENTS

FR         1502123         11/1967

* cited by examiner

*Primary Examiner*—Stephen M. Hepperle
(74) *Attorney, Agent, or Firm*—Hamilton, Brook, Smith & Reynolds P.C.

(57) ABSTRACT

Described herein are methods, systems, and articles that are useful for controlling a fluid blending system, such as a fluid utility system. The methods, systems, and articles of this invention allow for the control of both a quantity metric (e.g., pressure) of the blended fluid the fluid blending system as well as at least one quality metric of a blended fluid in a fluid blending system. For example, the methods, systems, and articles of this invention provide for the simultaneous control of both the pressure and quality of fuel gas within a fuel gas header system.

60 Claims, 14 Drawing Sheets

METHODS, SYSTEMS, AND ARTICLES FOR CONTROLLING A FLUID BLENDING SYSTEM

RELATED APPLICATION

This application claims the benefit of U.S. Provisional Application No. 60/467,208, filed on May 1, 2003, the entire teachings of which are incorporated herein by reference.

BACKGROUND OF THE INVENTION

The amount of fuel gas consumed in furnaces across a process complex depends on the quality of the fuel gas itself. Control devices adjust the flow of the fuel gas, either directly or indirectly, in order to maintain or achieve a desired coil temperature within a furnace. For example, if the calorific value of the fuel gas in the header system decreases, the coil temperature of a furnace is usually maintained by simply burning a larger amount of fuel gas. However, increasing the amount of gas extracted from the header system can disturb the pressure of the system.

Header pressure can be controlled by manipulating the flow of gasses into the header system (e.g., enrichment gasses and off-gasses). The relationship between the flow of gasses into a header system and the quality of the gasses within the header system depends on many factors, including the amount and quality of any gasses flowing into a header system as well as the volume, quality, and pressure of the gasses within the header system itself. These various factors typically vary continuously, rendering the relationship completely non-linear. This non-linear relationship typically applies to every enrichment stream and off-gas stream entering the fuel gas pool.

Existing feedback control systems for stabilizing fuel gas header systems are unable to control both the pressure and quality of the fuel gas leaving the header system. These control systems only attempt to control the pressure of the header system since excessively low pressure can result in unplanned shutdown of a production complex. To date, practitioners in the art have just accepted unstable header systems because it is either difficult to, or they are simply unable to, control both the pressure and quality of the fuel gas in a header system, to control the dynamic and steady state interaction in the fuel gas pool, to control the non-linear relationships, and to control the balance of fuel gas around a header system in order to control the pressure of the header.

A need exists for solutions that overcome the above-mentioned problems and can stabilize both the pressure and quality of a fluid in a utility system.

SUMMARY OF THE INVENTION

The present invention pertains to a non-linear control and optimization solution that stabilizes the quantity and quality of a blended fluid (e.g., a gas and/or liquid) in a fluid blending system. The present invention allows control of at least one quantity metric (e.g., a pressure or a volume) and at least one quality metric, simultaneously, within at least one fluid blending system.

In some embodiments, this invention features methods of controlling a fluid blending system. The fluid blending system distributes a fluid. In one example, the method comprises the step of simultaneously controlling both a quantity metric and a quality metric of the fluid of the fluid blending system. In another example, the method comprises the steps of determining at least one quality metric of a fluid in the supply stream and flow rates of supply and consumption streams, using a non-linear model to determine a quality metric of the blended fluid in the system and flow rate imbalances, and using at least one manipulated variable to control the quantity metric and at least one quality metric of the blended fluid, thereby controlling the fluid blending system.

In some embodiments, this invention features methods of controlling a fuel gas header system. The fuel gas header system includes at least one fuel gas input stream flowing into the fuel gas header system and at least one fuel gas output stream flowing out of the fuel gas header system.

In further embodiments, this invention features computer program products for controlling a fluid blending system. In one example, the computer program product comprises a computer usable medium and a set of computer program instructions embodied on the computer useable medium for controlling a fluid blending system. The computer program instructions comprise the step of simultaneously controlling both a quantity metric and a quality metric of the fluid of the fluid blending system.

In yet other embodiments, this invention features a computer system for controlling a fluid blending system. In one example, the computer system comprises a data transfer means for transferring data among components of a computer and a controller coupled to receive input from the data transfer means. The controller simultaneously controls both a quantity metric and a quality metric of a fluid that is distributed through the fluid blending system using the methods of this invention. In still further embodiments, this invention features a control system that simultaneously controls a quantity metric and a quality metric of a fluid in a fluid blending system. The fluid blending system includes at least one fluid supply stream entering the fluid blending system, at least one means for blending the fluid, and at least one blended fluid consumption stream leaving the fluid blending system. In one example, the control system comprises a controller means for calculating a control signal based upon a flow rate and a quality metric for at least one supply or consumption stream and a flow manipulation means in communication with the controller means. The flow manipulation means implements the control signals of the controller means using at least one manipulation controller that implements control laws, and implementation of the control signal results in the blended fluid having an acceptable quality metric and the fluid blending system having an acceptable amount of blended fluid.

In still more embodiments, this invention features chemical species that are manufactured by a process that includes a method of controlling a fluid blending system.

The present invention provides many benefits and advantages, including substantial increased economic benefits. For example, when the fluid blending system is applied to a fuel distribution system, this invention allows increased stability in the operating temperature of furnaces. This increase in temperature stability affects all manner of unit operations and allows them to be run closer to, and more reliably near, their design constraints. In another example, when the fluid blending system is applied to a fuel distribution system, this invention provides for lower furnace maintenance costs because the bridge wall and skin temperatures are more stable, resulting in a reduction in the need for tube replacement and increased furnace availability. Also, increased stability in furnace temperatures results in increasingly stable off-gasses reentering a fuel gas pool as it is easier to predict the quantity and quality of the off-gas streams, which in turn, makes it easier to balance header volumes and stabilize header pressure.

The increased furnace operating stability provided by this invention also allows improved compliance with environmental requirements (e.g., reduced SOx and NOx emissions). The increased stability provided by this invention also improves the consistency of product quality, decreases start-up time for process units, reduces operational errors due to a reduced operator stress and workload, reduces header enrichment costs, and reduces the need for flaring.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
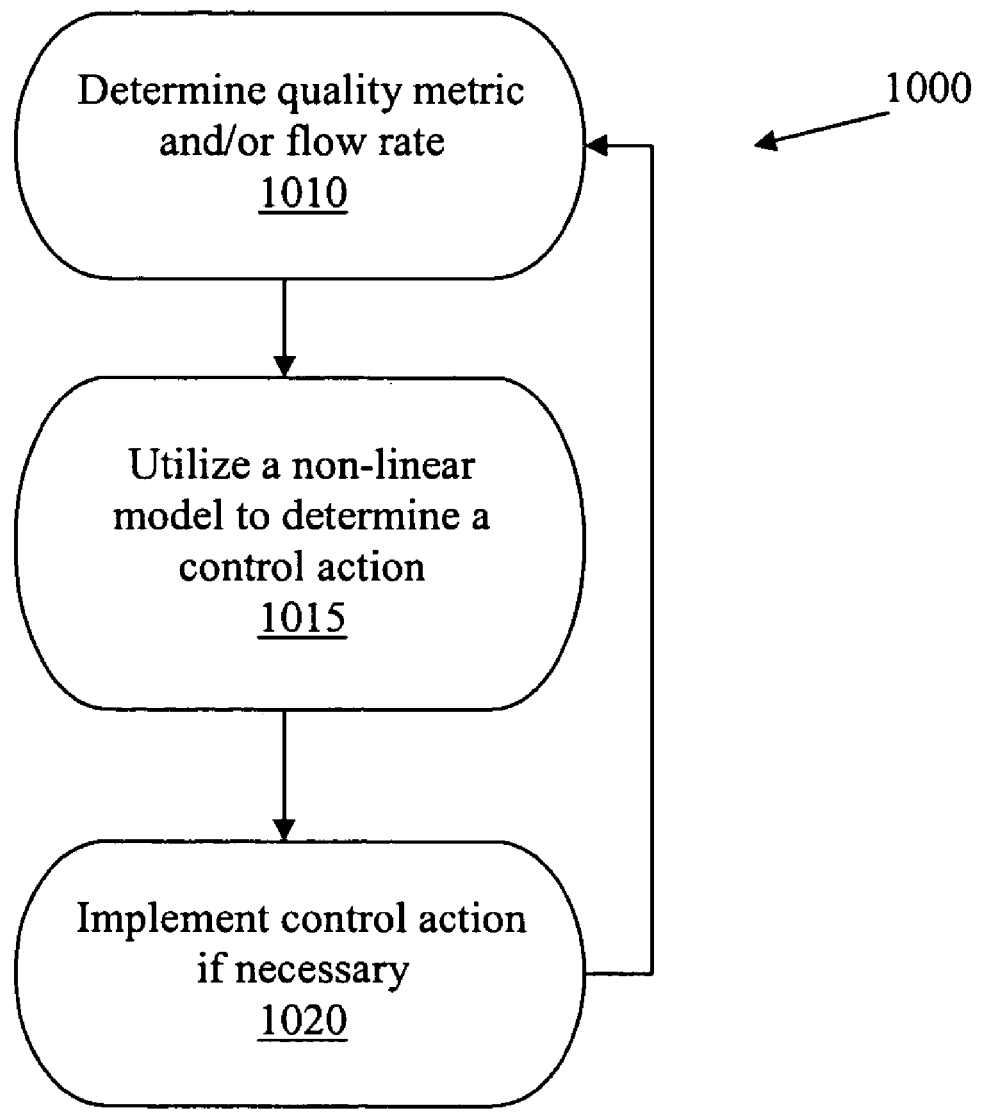
FIG. 1 illustrates a flow diagram of a process embodying a method of the present invention.

A description of preferred embodiments of the invention follows. While this invention has been particularly shown and described with references to preferred embodiments thereof, it will be understood by those skilled in the art that various changes in form and details may be made therein without departing from the scope of the invention encompassed by the appended claims.

Process complexes that burn fuel gas have one or more fuel gas headers to manage their fuel gas pool. A typical fuel gas header includes multiple off-gas streams entering the header from the various units across the complex, one or more enrichment gasses entering the header, and fuel gas streams leaving the header for consumption in furnaces or a pressure relieving flare.

Unstable fuel gas header pressure and quality is a common problem experienced by a number of process industries. One scenario that can produce or cause these instabilities is described as follows:

1. There is a net decrease in the amount of fuel gas in a header. Usually, this is because the amount of fuel gas consumed is greater than the amount of fuel gas entering the header. This decrease can result in a pressure drop in the header.
2. In order to increase or maintain the header pressure, an enrichment gas is usually added to the header. However, the addition of the enrichment gas increases the quality of the fuel gas (e.g., the calorific value of the fuel gas is increased) and results in a decrease in the amount of fuel gas consumed since. The reduced consumption rate results in an increase in the amount of fuel gas in the header system, which can result in an increase in the pressure of the header.
3. To decrease or maintain the header pressure, the flow of enrichment gas into the header is decreased, which in turn decreases the calorific value.

If no enrichment gas is flowing into the system, then fuel gas is usually flared to maintain or decrease the header pressure.

This is just one example of a scenario leading to the instability in fuel gas pressure and quality. Such a cycle can also be initiated by a net increase in the amount of gas in the header, or virtually any other disturbance in the header system. When the flow of gasses into and out of the header is at steady state, the instabilities are avoided. However, in the typical header system, the flow rates and/or calorific values of the off-gas streams entering the header system vary continuously and the amount of fuel gas leaving the header changes continuously.

This invention provides methods, systems, and articles for managing and controlling a fluid distributed from or within a fluid blending system. The methods, systems, and articles of this invention are particularly suited for application to process industries (e.g., the refining, petrochemical, hydrocarbon, polymer, and utility industries).

The methods, systems, and articles of this invention were developed after making several counter-intuitive insights, including:

1) That stabilizing the quality of the gasses within a header system provides stability to the amount of fuel gas consumed within the furnaces.

2) That stabilizing the amount of fuel gas consumed within the furnaces makes a surprisingly significant contribution to stabilizing the quality of the gasses within a fuel gas header.
3) Operating the furnaces at the minimum fuel gas quality reduces the amount of enrichment gas needed by a surprisingly significant degree, providing for an unexpectedly large reduction in costs.
4) That a fuel gas header system is substantially nonlinear and a particular independent variable can, under some operating conditions, have a positive impact on the header quality and a negative impact under other operating conditions.
5) That it is physically possible to operate furnaces at the minimum fuel gas quality that will ensure safe operation by stabilizing the fuel gas header quality.
6) That feed forward variables that predict the effect of changes in off-gas flows and quality can be used for calculating the gains of a modeled relationship between a controller's independent and dependent variables (i.e., the controller's inputs and outputs).
7) That the time-varying nature of the feed forward variables describing the effect of off-gas streams entering a header system have a deterministic effect on the amount of fuel gas consumed in the furnaces, which in turn effects the quality and flow rates of the resulting off-gas streams in a deterministic way due to a recycle effect of the header through the furnaces, and that this effect on the resulting off-gas streams in turn contributes to the conditions within the header system.
8) That modeling the recycle effect between a header system and off-gas streams is useful in deriving a system of equations that will accurately predict header pressure and quality.

While the description of the invention given herein will often be directed towards a fuel gas utility system, it will be apparent to those of skill in the art that the methods and articles of this invention can be applied to virtually any fluid (both gaseous and/or liquid) blending system that would benefit from an ability to control both the amount of the fluid flowing through the blending system and also at least one quality metric. For example, it will be apparent to those of skill in the art that the methods and articles of this invention can be applied to a steam delivery system, a hydrogen delivery system, or a fuel blending system that distributes a fluid that can include gasoline, diesel, and/or fuel oil.

In some embodiments, this invention features methods of controlling a fluid blending system, wherein the fluid blending system distributes a blended fluid, comprising the step of simultaneously, or nearly simultaneously, controlling both the volume and a quality metric of the blended fluid within the fluid blending system. In one example, the method comprises the steps of determining at least one quality metric of a fluid in the supply stream and flow rates of supply and consumptions streams, using a non-linear model to determine a quality metric of the blended fluid in the system and flow rate imbalances, and controlling both a quantity metric and quality metric of the blended fluid using at least one manipulated variable, thereby controlling the fluid blending system. Examples of suitable quality metrics include calorific value of the fuel gas, the equivalent fuel oil value of the fuel gas, the density of the fuel gas, the heating value of the fuel gas, etc. Examples of suitable quantity metrics include pressure in a fuel gas header or a level of a fluid in a tank.

FIG. 1 illustrates a flow diagram of Process 1000, embodying a method of the present invention. Process 1000 can be used to control a fluid blending system. For example, the fluid blending system can comprise a fluid blending means (e.g., a gas header or other fluid blending pool), at least one fluid supply stream directing a fluid into the fluid blending system (e.g., an off-gas stream or an enrichment stream), and at least one consumption stream directing a blended fluid out of the fluid blending system (e.g., a fuel gas stream feeding a furnace or a header pressure relief valve).

Step 1010 includes determining at least one quality metric (e.g., the calorific value) and at least one flow rate for one or more fluid supply streams and/or one or more fluid consumption streams. In some embodiments, a quality metric and/or the flow rates for all streams entering and leaving the blending system are determined.

The quality metric or flow rates can be determined through, for example, measurement or estimation. This can be done through the use of a quality and/or flow rate determination means or system. For example, one or more measurement devices can be utilized to determine the quality. The measurement devices can, for example, calculate the quality metric using first principle calculations (e.g., rigorous first principle calculations) or an empirical model (e.g., a Bounded Derivative Network). Optionally, the measurement devices can be calibrated with process data, data from an online hardware analyzer, and/or data from laboratory analysis. The measurement devices can receive process data from a distributed control system or other input device. In other embodiments, the measurement device is an online hardware analyzer.

At Step 1015, at least one non-linear model is utilized to determine if any control action would be beneficial or desirable. Examples of non-linear models include a non-linear fluid blending model or a non-linear furnace model, as such models are particularly useful. A non-linear fluid blending model can be used to determine or predict the net amount of fluid flowing into the blending system (i.e., whether an imbalance exists and the magnitude of any such imbalance), a quantity metric relating to amounts of fluid inside a blending system, and/or a quality metric of the blended fluid within the blending system. Optionally, one or more flow manipulation models can be utilized to calculate fluid supply or consumption, other flow rate process constraints in a blended fluid system. For example, one or more non-linear furnace models can be utilized to calculate fuel gas consumption rates and/or furnace coil outlet temperatures based upon fuel gas quality, burner counts, and/or fuel gas or alternative fuel (e.g., fuel oil) pressure controller set points.

In some embodiments, a model is created based upon a previously determined non-linear model (e.g., a non-linear model utilized in a previous control cycle or iteration). Optionally, the non-linear model is defined or selected previously.

The non-linear model can be used by, or feed information to, a controller means (e.g., an blending system controller) so that if it is necessary or desirable, the controller means calculates a control signal based upon the determined flow and/or quality metric data.

In some embodiments, the non-linear model is based upon rigorous equations or an empirical model (e.g., a Bounded Derivative Network). Optionally, the non-linear model is calibrated with, is based upon, or in some other way uses, the quality and/or flow rate data determined during Step 1010. In further embodiments, the non-linear model can be embedded in a non-linear model predictive control law or controller. In still further embodiments, the non-linear model is used to adapt state gains of a linear model predictive controller.

At Step 1020, a desired control action, as determined in Step 1015, is taken, if necessary or desirable, by a flow manipulation means in order to control both a quantity metric and a quality metric of the blended fluid in the blending system. The flow manipulation means implements the control signals of the controller means using at last one manipulation controller that implements control laws. For example, one or more manipulation controllers can receive control signals from the controller means requesting a desired flow rate in one or more supply or consumption streams, and the implemented control law satisfies those requests. In this way, controlling the supply of fluid to the fluid blending system and/or control the consumption of blended fluid from the blending system can result in blended fluid having a desired quality metric and a desired fluid flow imbalance into blending system. If it is determined that the quality metric of the blended fluid and the net amount of fluid flowing into the blending system are acceptable, no control action need be taken, and the method loops back to Step 1010 to begin the control process again.

In some embodiments, a non-linear flow manipulation model can be used to implement control actions. For example, a blending system controller can relay control actions and/or other information (e.g., constraint parameters) to a flow manipulation controller means. Optionally, the flow manipulation controller means then utilizes a non-linear or linear flow manipulation model to determine or take specific or appropriate control action(s).

Exemplar System Overview

Figure 2:
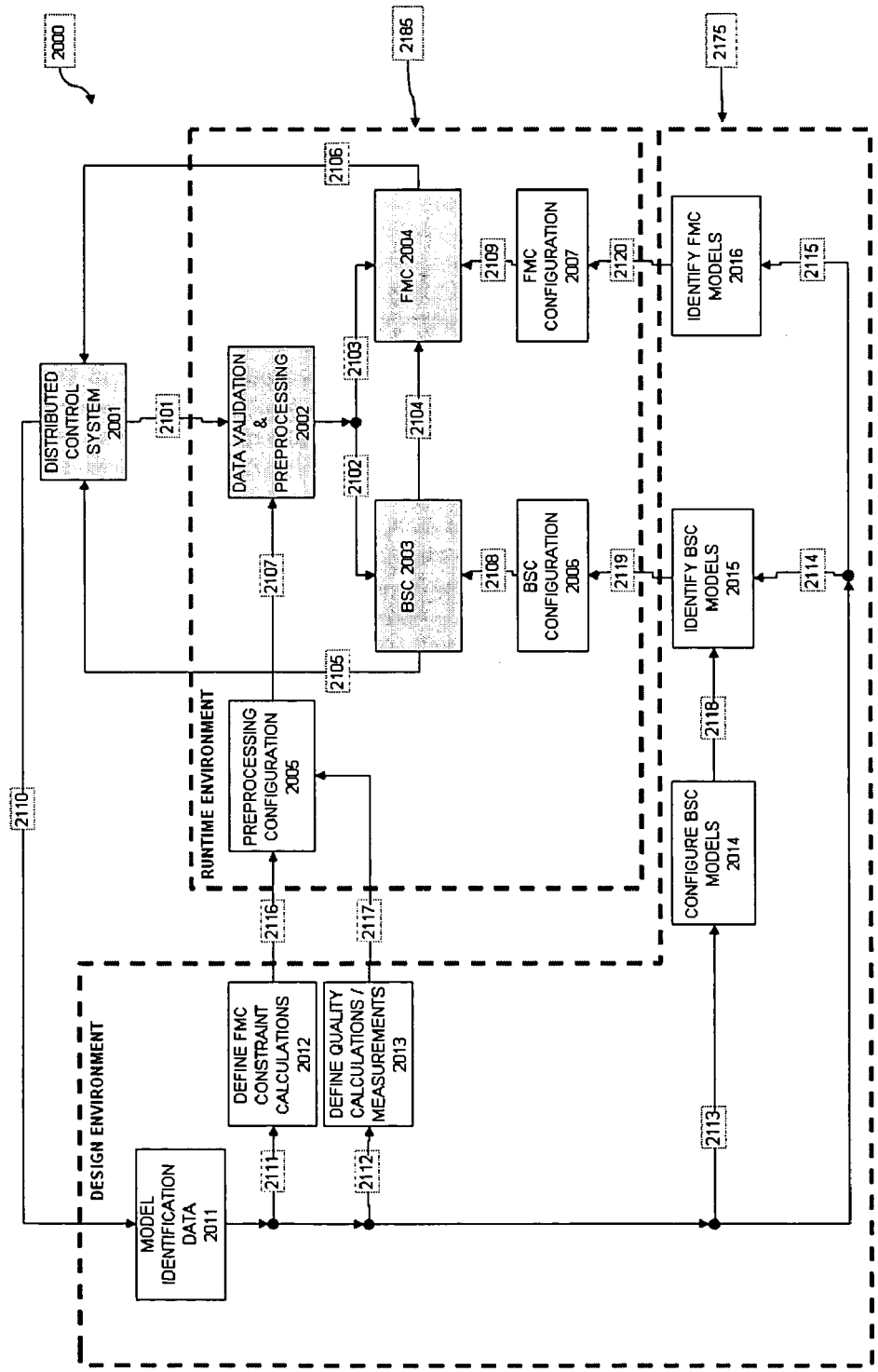
FIG. 2 illustrates an embodiment of the present invention that features a control system for controlling a quantity metric and a quality metric of a blended fluid.

FIG. 2 illustrates one embodiment of a control system for simultaneously controlling a quantity metric and a quality metric of a fluid in a fluid blending system. System 2000 includes a design-time environment 2175, a run-time environment 2185, and distributed control system 2001. The flow of information and/or control signals between the various components of system 2000 is indicated by the inter-component flow arrows. A brief overview of some of the components of system 2000 includes:

Design-Time Environment Model Identification Data 2011

Model identification data 2011 includes process data, typically obtained through step testing, used to configure and design the control system.

Define FMC Constraint Calculations 2012

The FMC constraint calculations are engineered at design-time. These calculations are passed to preprocessing configuration 2005 from where the calculations can be accessed by data validation and preprocessing 2002 during run-time.

Define Quality Calculations/Measurements 2013

Calculations and other means for measuring fluid quality are engineered at design-time and are passed to preprocessing configuration 2005, from where they can be accessed by data validation and preprocessing 2002 during run-time.

Configure Blending System Controller 2014

Configuring the blending system controller (BSC) models includes identifying the number of blending pools, and the process streams that enter and exit the blending pool.

Identify Blending System Controller Models 2015

Once the BSC Models have been configured in BSC 2014, the flows and quality metrics of the input streams, and the flows of output streams are used to create model equations. The parameters of these equations can be identified using data from model identification data 2011.

Identify FMC Models 2016

The parameters of the appropriate models are identified using data from model identification data 2011 for each fluid modular controller (FMC).

Run-Time Environment Preprocessing Configuration 2005

The calculations defined in 2012 and 2013 are passed to preprocessing configuration 2005, and from there, the calculations can be updated during run-time. Data validation and preprocessing 2002 executes the defined calculations from the preprocessing configuration 2005.

Blending System Controller Configuration 2006

The controller configurations, models, and/or tuning defined in 2014 and 2015 are passed to blending system controller (BSC) Configuration 2006. The configuration, models, and/or tuning of BSC Configuration 2006 can be updated during run-time. BSC 2003 can retrieve the configuration, models, and/or tuning in this section during each execution.

Fluid Manipulation Controller Configuration 2007

The fluid manipulation controller (FMC) configuration, models, and/or tuning defined at 2016 are passed to FMC Configuration 2007. The configuration, models, and/or tuning can be updated during run-time. FMC 2004 can retrieve the configuration, models, and/or tuning from FMC Configuration 2007 during each execution.

Data Validation & Preprocessing 2002

Data is retrieved from the Distributed Control System 2001 from where it is validated using standard data validation rules. After data validation, the defined calculations in Preprocessing Configuration 2005 are executed. The calculation results along with other validated data is passed to BSC 2003 and FMC 2004.

BSC 2003

BSC 2003 contains the actual online controller, receiving inputs from data validation and preprocessing 2002 and sending outputs to FMC 2004 and distributed control system 2001. BSC 2003 controls the amount of fluid in the fluid pool, the net amount of fluid flowing into or out of the fluid pool, and/or at least one quality metric of the blended fluid in the fluid pool. The controller configuration, models, and tuning can be contained in BSC Configuration 2006.

Fluid Manipulation Controller (FMC) 2004

FMC 2004 receives inputs from BSC 2003 and writes outputs to the Distributed Control System 2001. FMC 2004 controls the fluid flow rate target received from BSC 2003 while keeping to specific process constraints and requirements. The controller configuration, models, and/or tuning can be contained in FMC Configuration 2007.

System 2000 illustrates just one embodiment of the systems, methods, and articles of this invention. Further details on system 2000 are described below, however, those skilled in the art will appreciate that variations on system 2000 can be implemented without undue experimentation and are included in the invention.

Define Constraint Calculations

The fluid manipulation controller (FMC) constraint calculations can be used to provide feedback about the FMC constraints to BSC 2003 from the fuel gas manipulation controller 2004. This feedback can be used to adjust the high and low operating limits on the manipulated fuel gas consumptions in the BSC 2003. This procedure allows the BSC 2003 to send fuel gas consumption targets down to the fuel gas manipulation controller 2004, which are obtainable. An example of such calculations is as follows:

Consider a dual firing furnace. In order to manipulate the fuel gas consumption in the furnace, the fuel oil consumption will also have to change in the opposite direction to maintain the required heater duty. To evaluate the limits of the fuel gas consumption the following calculations are performed:

Functions:

```
function BPDMve(BnrC real, PSPMve real, P_Flow_Gain real, POPMve
real, BGain real, EFO real)
    local P_OP_Gain real;
    local SPMve real;
    local OPMve real;
    local MinMve real;
    local DelP real;
    P_OP_Gain = BnrC*BGain;
    SPMve = PSPMve;
    OPMve = POPMve/P_OP_Gain
    if SPMve < OPMve then
        MinMve = SPMve;
    else
        MinMve = OPMve;
    end;
    Return(MinMve*P_Flow_Gain*24/158.984*EFO);
end;
function HConstr(FGMveU real, FOMveD real, EFO real, FGFlow real)
    local Mve real;
    if FGMveU < FOMveD then
        Mve = FGMveU;
    else
        Mve = FOMveD;
    end;
    Return(FGFlow + Mve/24*158.984/EFO);
end;
function LConstr(FGMveD real, FOMveU real, EFO real, FGFlow real)
    local Mve real;
    if FGMveD < FOMveU then
        Mve = FGMveD;
    else
        Mve = FOMveU;
    end;
    Return(FGFlow - Mve/24*158.984/EFO);
end;
```

Main Calculations:
EFO=Fuel gas effective fuel oil (quality)
PFG_G=($\Delta$ Fuel Gas Flow/$\Delta$ Fuel Gas Pressure)
BnrC_G=Fuel gas burner count
SPMveGU=(FuelGasPressure High Limit−FuelGasPressure Setpoint)
OPMveGU=(100−FuelGasPressure Valve Output)
SPMveGD=(FuelGasPressure Setpoint−FuelGasPressure Low Limit)
OPMveGD=(FuelGasPressure Valve Output−0)
UGas=BPDMve(BnrC_G, SPMveGU, PFG_G, OPMveGU, 1, EFO)
DGas=BPDMve(BnrC_G, SPMveGD, PFG_G, OPMveGD, 1, EFO)
PFG_O=($\Delta$ Fuel Oil Flow/$\Delta$ Fuel Oil Pressure)
BnrC_O=Fuel oil burner count
SPMveOU=(FuelOilPressure High Limit−FuelOilPressure Setpoint)
OPMveOU=(100−FuelOilPressure Valve Output)
SPMveOD=(FuelOilPressure Setpoint−FuelOilPressure Low Limit)
OPMveOD=(FuelOilPressure Valve Output−0)
UOil=BPDMve(BnrC_O, SPMveOU, PFG_O, OPMveOU, 1, 1)
DOil=BPDMve(BnrC_O, SPMveOD, PFG_O, OPMveOD, 1, 1)
Flow=Fuel Gas Consumption
Lower Limit=LConstr(DGas, UOil, EFO, Flow);
Upper Limit=HConstr(UGas, DOil, EFO, Flow);

Define Quality Calculations/Measurements

The calculation of overall quality in a blending pool requires information about the quality of the fluid in the streams feeding the blending pool. In some embodiments, the methods of this invention include an inferential calculation layer that typically include a large number of inferential calculations which are defined or built to provide this quality information. In further embodiments, the inferential calculation layer constructs or builds inferentials for all the flow streams entering fluid blending system. These inferentials can be used in the calculation of overall quality in the blending pool, and can also be used as feed forward variables for the blending system controller, and optionally, the flow manipulation controllers.

Inferential calculations are built for at least one fluid steam entering the fluid blending pool. In some embodiments, inferentials are calculated for each fluid stream entering the fluid blending pool. Optionally, an average quality value can be used for any stream that enters the fluid blending pool, providing that such a stream will contribute very little to the amount of fuel gas in the system.

The inferential calculations can be based upon rigorous first principal calculations. The use of rigorous first principal calculations provides for inferential outputs with an accuracy that is sufficient to allow the inferential outputs to be used to calculate the non-linear models inside the non-linear multivariable controller solution. Closed loop instability can result if the sign (e.g., positive or negative) of the inferential calculation is incorrect, hence, care should be taken to ensure the correct sign is obtained from the inferential calculations. Examples of suitable first principle models for use in formulating the inferentials include ASPEN PLUS® (available from Aspen Technology, Inc, Cambridge, Mass.) or PRO/II® (available from Simulation Sciences, Inc. Corp., Lake Forrest, Calif.).

Runtime Preprocessing

Figure 3:
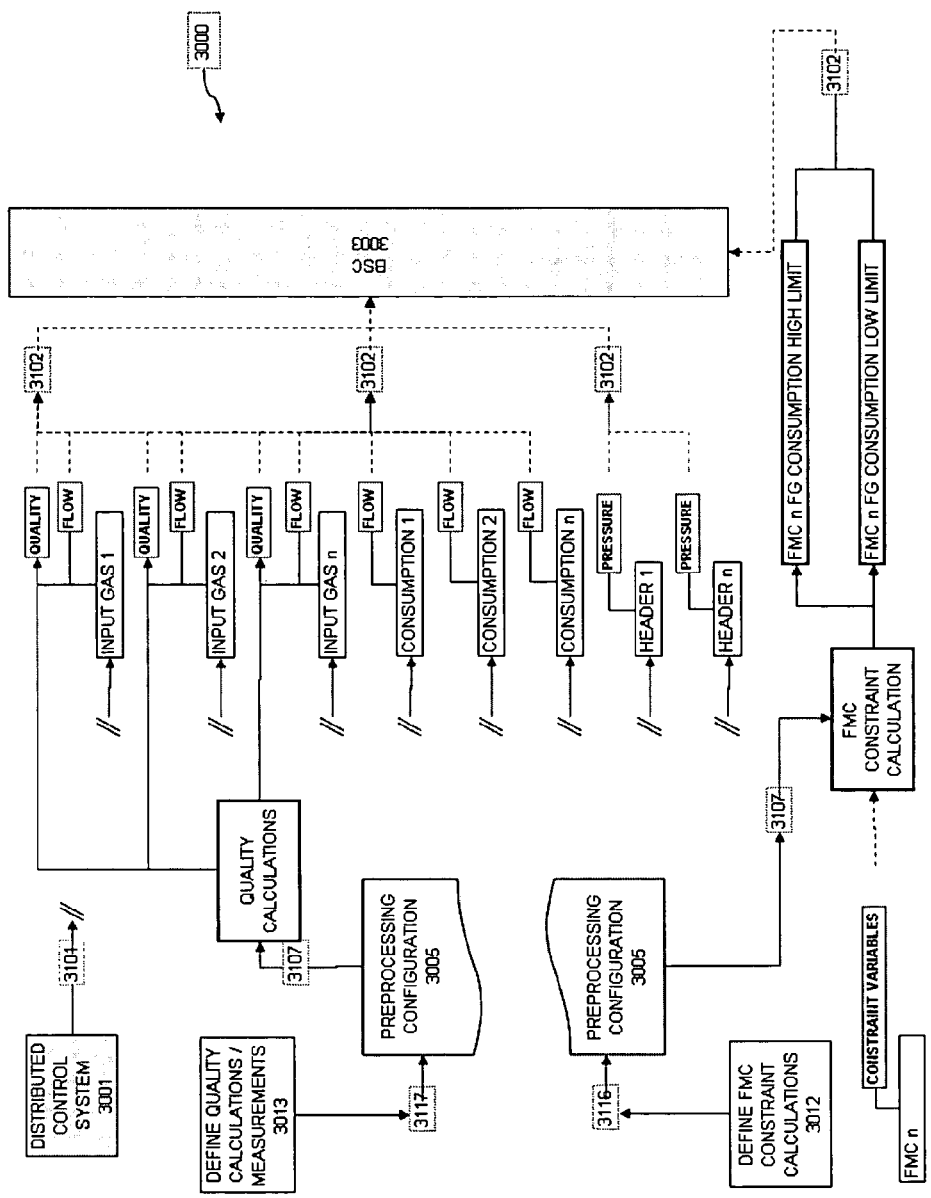
FIG. 3 illustrates a preprocessing block of a portion of a process encompassed by the present invention.

FIG. 3 illustrates the preprocessing block of a portion of process 3000, an embodiment of a process of the invention for controlling a quantity metric and one quality metric of a blended fluid. The quality inferentials and FMC constraint calculations are performed in the preprocessing block and the results passed to the BSC 3003. Raw data is read from the distributed control system 3001 and validated. Validation includes standard data validation procedures such as freeze checking, rate of change validation, etc.

The quality inferentials and FMC constraint calculations are built in the design environment as illustrated in Block 3013 and Block 3012. The resulting equations are then stored in the runtime environment in a Preprocessing configuration block 3005. Preprocessing configuration 3005 then references the configuration block and performs the specified calculations. The results from the calculations, along with other validated data (e.g., flow rates and pressures), are then passed to BSC 3003.

Configure and Identify Blending System Models

The present invention includes a non-linear multivariable control solution. In some embodiments, the non-linear multivariable control solution creates a new quality model for the fluid blending system with every execution cycle—this model can be derived from blending calculations. The new quality models can be used in a linear multivariate control scheme. In the preferred embodiment, the nonlinear blending calculations are incorporated directly into a nonlinear model which is embedded into a fully nonlinear control solution. Inferential measurements are used to determine the quality of the input streams feeding the blending pool. The control solution simultaneously balances a quantity metric and a quality metric of the fluid in the pool. This control solution executes typically every 5 to 15 seconds in a fuel gas blending system, however, it can be desirable to have substantially shorter or longer execution frequencies when controlling other types of blending systems.

Figure 4:
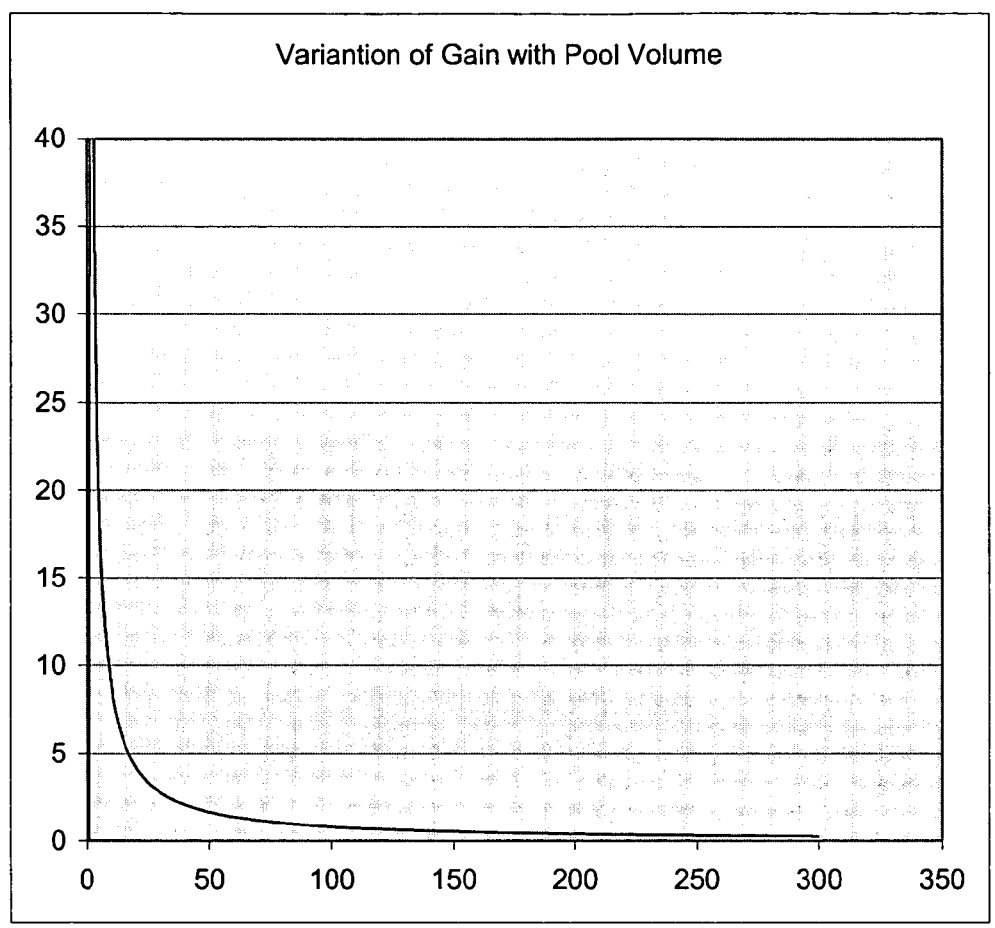
FIG. 4 illustrates a graph showing the relationship between a gain of a quality model and the amount of fluid in a fluid blending system.
Figure 5:
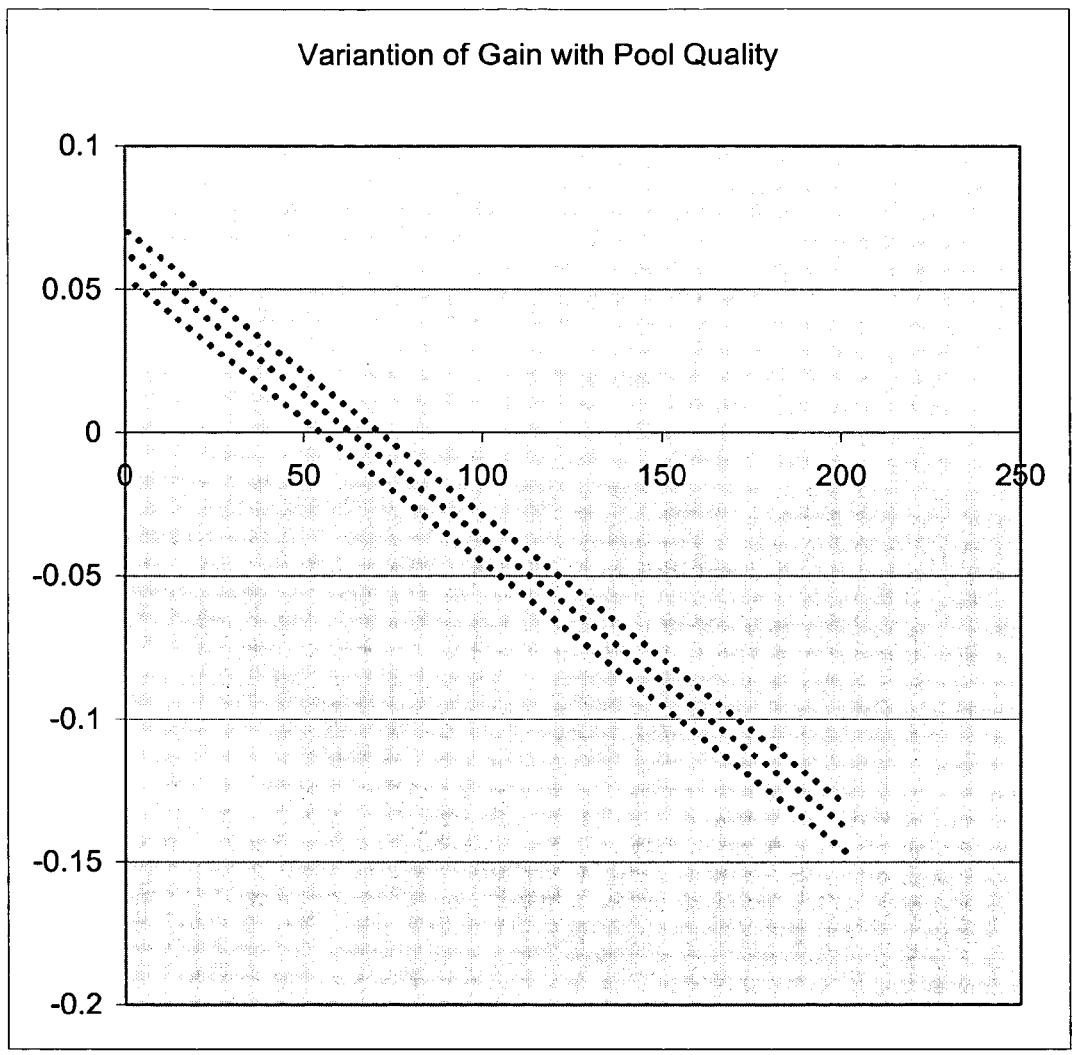
FIG. 5 illustrates a graph showing the relationship between a gain (with respect to input stream quality) of a blending pool quality and the blending pool quality itself.

The need for a nonlinear control solution is illustrated in FIGS. 4 and 5. FIG. 4 illustrates a graph showing the relationship between a gain of a quality model and the amount of fluid in a fluid blending system. The x-axis of that graph represents the volume of fluid in the blending system, while the y-axis represents the gain of the header's quality model in response to a unit step change in the volume of fluid. Generally, the variation in the gain is smaller for a unit step change in the volume of fluid flowing into header systems that contain a relatively large amount of gasses.

Figure 6:
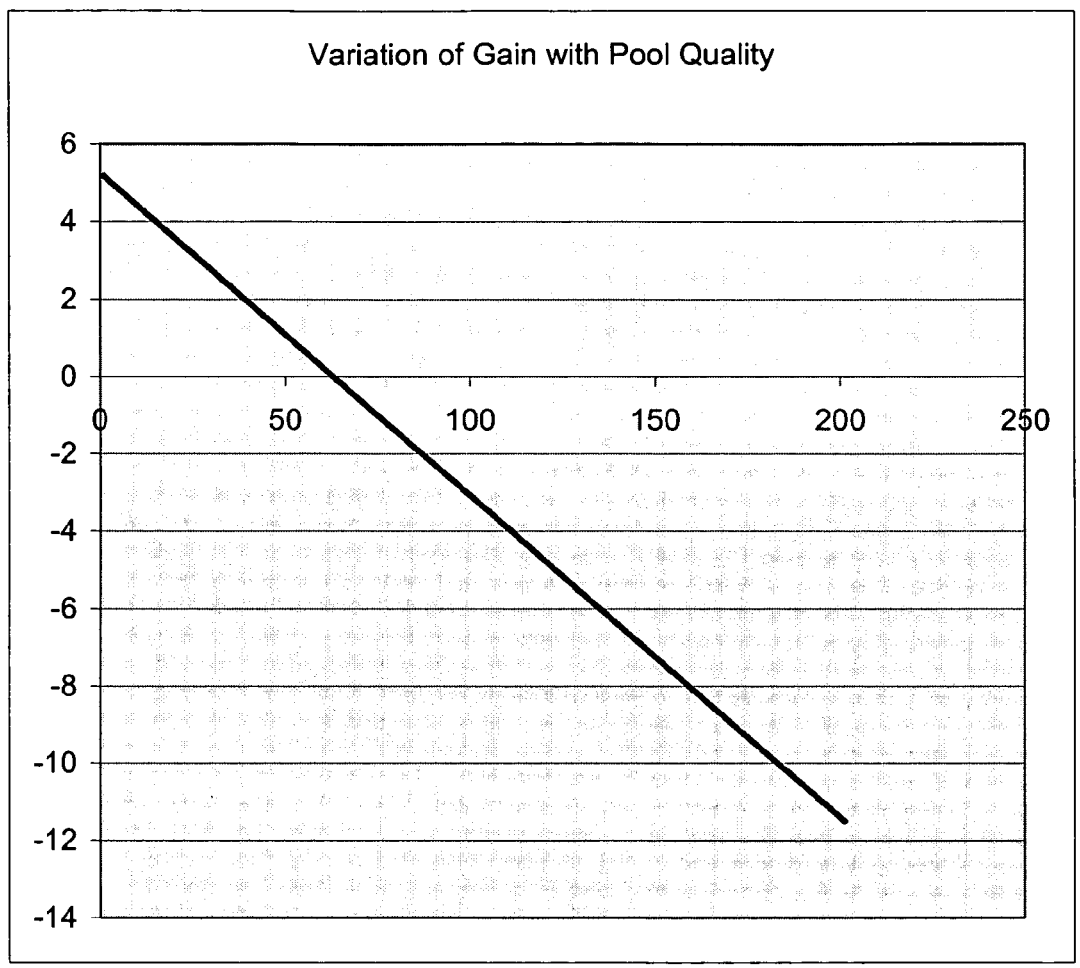
FIG. 6 illustrates a graph of a gain of a quality model as it varies linearly with blended fluid quality.

FIG. 5 illustrates a graph showing the relationship between a gain (with respect to input stream quality) of a blending pool quality and the blending pool quality itself. The x-axis of that graph represents the quality of the fluid, while the y-axis represents the gain of the blending system quality model in response to a unit step change in the quality of the input stream. The three different trend lines in FIG. 5 represent the gain curves for three different qualities of fluid in the input stream. The graph of FIG. 6 illustrates that, for a particular input stream quality, the gain of a quality model will vary linearly with the blended fluid quality, and that the gain changes sign from positive to negative when blended quality rises above the input stream quality.

Hence, there are two independent variables for every fluid entering a fluid blending system: one for variations in the flow rate of an input stream and a second for variations in the quality of the input stream. In addition, every consumption or distribution stream out of blending system also contributes a flow rate. Any of the flow variables can be control handles. The specification of the number of supply streams, the number of consumption streams, and whether or not they are manipulation variables (MVs) is configurable as part of the design environment.

Figure 7:
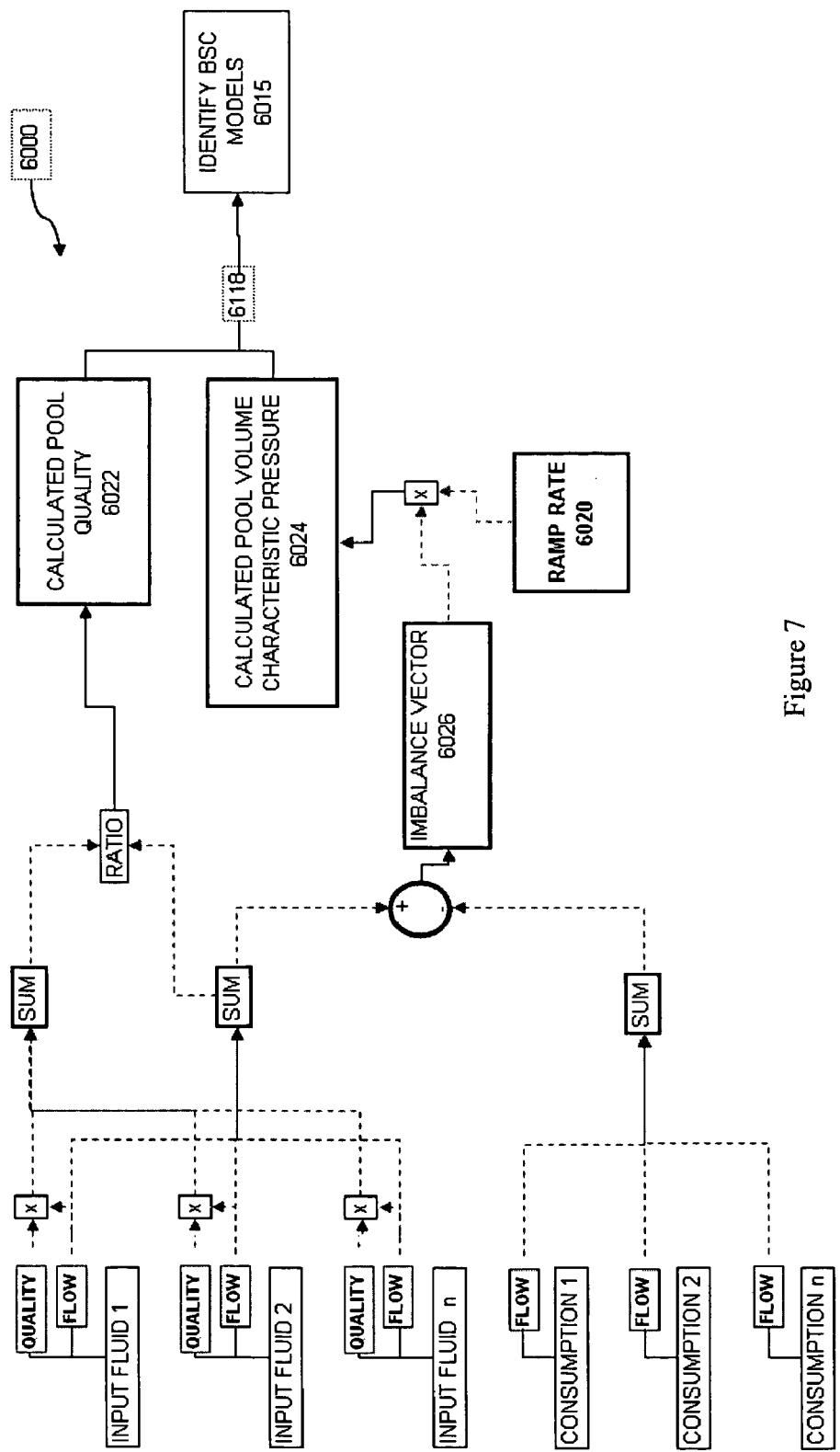
FIG. 7 schematically illustrates blending equations for one embodiment of the invention as applied to a fuel gas header system and used to identify fuel gas optimization models.

FIG. 7 schematically illustrates the blending rule calculations of one embodiment of the invention as applied to a fuel gas header system and used to identify BSC Models at 6015.

At design time, a practitioner configures the Blending Model by specifying the following:
Number of Controlled Supply Streams
Number of Uncontrolled Supply Streams
Number of Controlled Distribution Streams
Number of Uncontrolled Distribution Streams
Number of Blending Pools For each blending pool, a nonlinear model is then constructed which embodies the mathematical relationship between the inputs and two dependent variables, namely those indicated in Table 1:

TABLE 1

| Variable | Description |
|---|---|
| $MVFIn_i$ | Flow of $i^{th}$ Controlled Supply Streams |
| $MVQIn_i$ | Quality Metric of $i^{th}$ Controlled Supply Streams |
| $MVFOut_i$ | Flow of $i^{th}$ Controlled Distribution Streams |
| $DVFIn_i$ | Flow of $i^{th}$ Uncontrolled Supply Streams |
| $DVQIn_i$ | Quality Metric of $i^{th}$ Uncontrolled Supply Streams |
| $DVFOut_i$ | Flow of $i^{th}$ Uncontrolled Distribution Streams |
| CVQual | Blended Quality |
| CVPress | Quantity Metric (e.g., pressure in a gas header) |

In Table 1, a prefix of "MV" refers to a Manipulated Variable, i.e. a Controller 'handle', a prefix of "DV" refers to a measured Disturbance Variable (sometimes referred to as a Feed Forward variable or FF), and "CV" refers to a Controlled Variable. The equations below are shown for a Fuel Gas System in which the second CV represents Pressure in the header, however, it will be apparent to those skilled in the art that the second CV could represent any quantity metric. For example, in a liquid blending system this might be a level rather than a pressure—but in either case, the second CV is derived from the Imbalance calculation.

Equations:

For each blending pool, the following equations are assembled into the model used for nonlinear optimization and control of the blending system:

$$CVQual = \frac{\left(\sum_{controlled}(MVFIn_i \cdot MVQIn_i) + \sum_{uncontrolled}(DVFIn_i \cdot DVQIn_i)\right)}{\left(\sum_{controlled}(MVFIn_i) + \sum_{uncontrolled}(DVFIn_i)\right)}$$

$$CVPress = RampRate \cdot Imbalance$$

where $$Imbalance = \left(\sum_{controlled}(MVFIn_i) + \sum_{uncontrolled}(DVFIn_i)\right) - \left(\sum_{controlled}(MVFOut_i) + \sum_{uncontrolled}(DVFOut_i)\right)$$

Dynamic Equations

In some embodiments, dynamics are introduced to these equations by passing inputs through a first order dynamic filter and feeding the filtered values into the static equations of the previous section. The time constants for these filters are set as part of the configuration or identification of the models. Other means of introducing dynamics, which will occur to those skilled in the art are also covered by this invention.

Identification

That RampRate tuning parameter which relates the Imbalance Calculation to, for example, the Pressure CV can be set manually or can be identified from operating data (e.g., model identification data 2011 referenced in FIG. 2), so that it matches the specific blending process.

In some embodiments, blending pools may be connected via additional control valves which can become MVs in the assembled models. These modify the equations since two pools can be considered separate or the same depending on the state of the MV.

Identify FMC Model

A Flow Manipulation Controller (FMC) 2004 can make use of an FMC Model which typically can be either a parameterized set of rigorous equations whose parameters are identified from operating data, or is an empirical model (such as a Bounded Derivative Network) fully or partially identified from operating data. Such a model specifies the relationship between manipulated variables (MVs) and/or disturbance variables (DVs) and fluid flow of a supply or consumption stream. This fluid flow is a controlled variable (CV) of the FMC whose desired value is calculated by the blending system controller. Such an FMC model can also include other CVs if, for example, additional constraints are desirable. In a preferred embodiment, each FMC model is based on a parameterized set of dynamic equations.

For example, in a fuel gas system, an FMC can be a model of a furnace consuming fuel gas from a fuel gas header. The furnace model can include a CV such as a coil outlet temperature which can be controlled by additional manipulated variables such as a fuel oil pressure PID controller set-point. The equations below are an example of typical FMC model. Tables 2 and 3 list variables and parameters, respectively, for the equations.

Equations

The steady state equations are given by:

$$COT = \frac{24}{158.984} \cdot COTGN \cdot$$
$$((1000 \cdot FOBC \cdot FOBN \cdot \sqrt{FOPSP - DSP}) + .$$
$$(FGF \cdot FGEFO))$$

$$FOPOP = FOPGN \cdot FOBN \cdot FOPSP$$
$$FGPOP = FGPGN \cdot FGBN \cdot FGPSP$$
$$FGF = FGFGN \cdot FGBC \cdot FGBN \cdot \sqrt{FGPSP - DSP}$$

TABLE 2

| Variable | Description | Role |
|---|---|---|
| FOPSP | Fuel Oil Pressure Setpoint | MV |
| FGPSP | Fuel Gas Pressure Setpoint | MV |
| DSP | Downstream Pressure | DV |
| FGEFO | Fuel Gas Quality | DV |
| FOBN | Fuel Oil Burner Count | DV |
| FGBN | Fuel Gas Burner Count | DV |
| FOBR | Fuel Oil Burner Resistance (m$^3$/pressure unit) | DV |
| FGBR | Fuel Gas Burner Resistance (Nm$^3$/pressure unit) | DV |
| FGF | Fuel Gas Consumption | DV/CV |
| COT | Coil Outlet Temperature | CV |
| FOPOP | Fuel Oil Pressure Controller Output | CV |
| FGPOP | Fuel Gas Pressure Controller Output | CV |

TABLE 3

| Parameters | Description |
|---|---|
| COTGN | Duty to Coil Outlet Temperature Gain |
| FOPGN | FOPOP to FOPSP Gain |
| FGPGN | FGPOP to FGPSP Gain |

Dynamic Equations

In some embodiments, dynamics are introduced to these equations by passing inputs through a first order dynamic filter and feeding the filtered values into the static equations of the previous section. The time constants for these filters are set as part of the configuration or identification of the models. Other means of introducing dynamics, which will occur to those skilled in the art are also covered by this invention.

Identification

The tuning parameter described in the parameter table above can be set manually or can be identified from operating data (e.g., model identification data 2011 referenced in FIG. 2), so that it matches the furnace system.

Configure FGO and FMC Controllers

The BSC and FMC are configured at 2006 and 2007 of FIG. 2, respectively. Configuration refers to the following two activities:

(a) Set tuning parameters for the Controllers
(b) Connect variables and, optionally, tuning parameters to the DCS or other I/O system The tuning parameters of the controllers are the parameters that affect the Estimator, Optimizer, and Controller objectives as described in the General Controller Calculations section. Tuning parameters are used, among other things, to set the controller objectives, to control the aggressiveness of the controller to achieve those objectives, and to control how infeasibility is handled when specified constraints cannot be achieved. Different commercial controllers have high level tuning parameters which map to the parameters of the low level equations. These types of parameter are well known to those skilled in the art.

Configuration of the I/O is specified by connecting any element of the controllers to a DCS point, and specifying whether the value should be read from or written to that point. Once the I/O is configured, the runtime system is able to receive measurements and parameters from the distributed control system 2001 via channel 2101, process the data through the Data Validation and Preprocessing Block 2002, communicate the processed data via channel 2102 to the Blending System Controller 2003, and via channel 2103 to the Volume Manipulation Controller 2004, perform the controller calculations, and implement the controller moves on the plant via channels 2105 and 2106.

Such configuration activities are a standard part of configuring and deploying commercial controllers. The preferred embodiment of this invention uses the Aspen Apollo TM Controller and uses Aspen Apollo Config to do this configuration (both available from Aspen Technology, Inc., Cambridge, Mass.). Another embodiment uses the DMC-plus® Controller from Aspen Technology and uses DMC-plus® Build to do the configuration (both available from Aspen Technology, Inc., Cambridge, Mass.).

Multivariable Design to Create the Necessary Degrees of Freedom

The methods of the present invention include creating and using manipulated and control variables in order to provide a desired number of additional degrees of freedom so that both a volume characteristic and a quality metric of a fluid blending system can be controlled and/or stabilized simultaneously. These extra degrees of freedom can be created in various ways, depending on the exact lay out of the production complex.

For example, some furnaces can burn more than one type of fuel (e.g., both fuel oil and fuel gas). The coil outlet temperature of such furnaces can be controlled by managing the flow of the non-fuel gas fuel. The rate of fuel gas consumed in the furnace can be manipulated, while the coil is kept at a desired temperature by varying the consumption rate of the non-fuel gas fuel(s). In this manner, an extra degree of freedom is produced in the fuel gas header control system.

In another example, where multiple headers are included in the fuel gas system, the distribution between the headers and/or off-gas distribution to the headers can be manipulated keeping volume balances with enrichment gases.

In yet another example, additional degrees of freedom can be created with the use of enrichment gasses that are close to the quality of the fuel gas pool. Use of such enrichment gases allows for control of the header pressure, while alleviating the variation in header quality, thereby stabilizing both header quality and pressure. In a further example, an additional degree of freedom can be created by simultaneously using two or more enrichment gasses having dissimilar qualities. By manipulating the relative amounts of the dissimilar enrichment gasses entering the header system, the controllability of the fuel gas header can be influenced.

Blending System Controller

Figure 8:
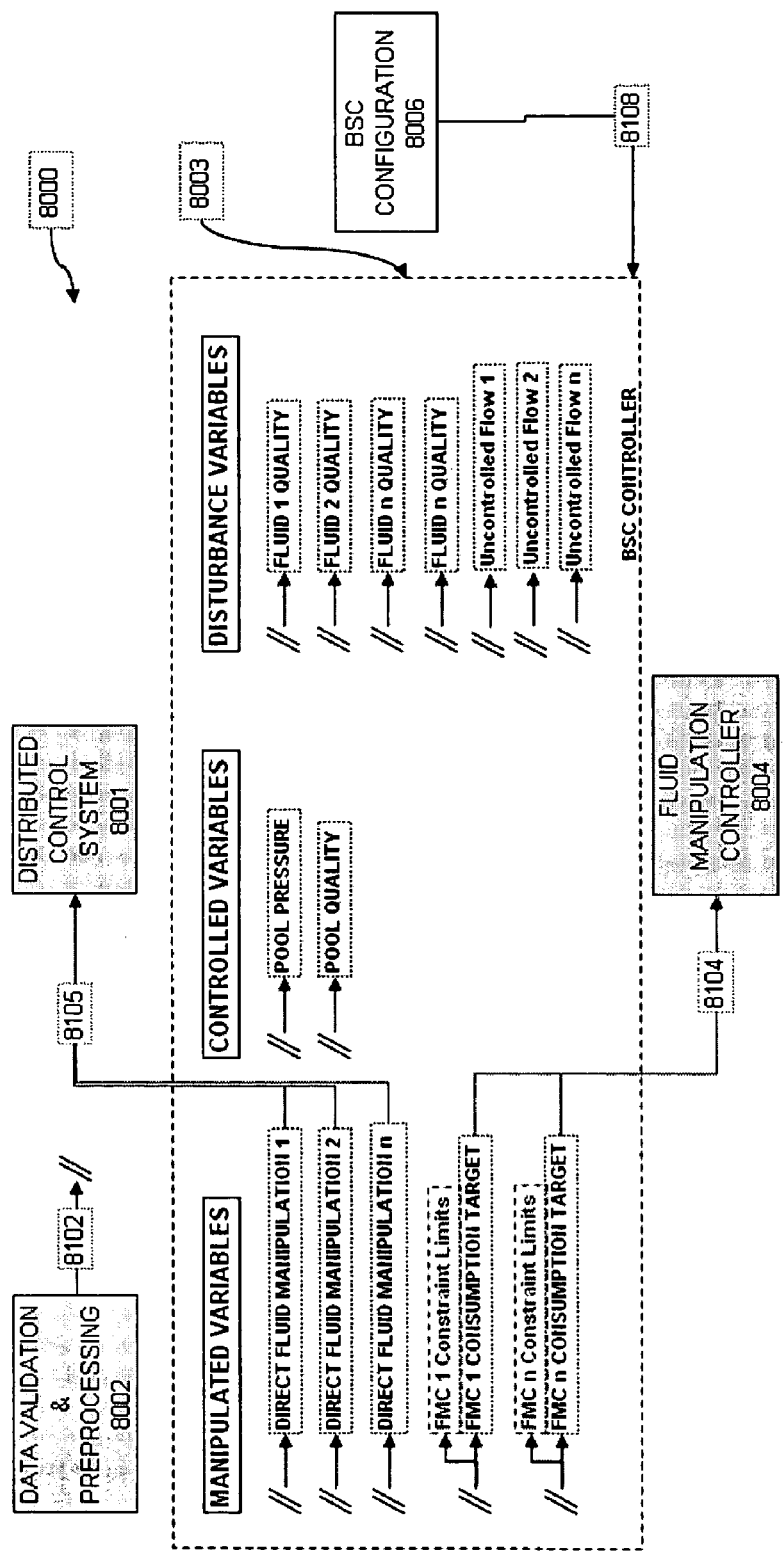
FIG. 8 illustrates a portion of a process embodying the invention which includes a Blending System Controller (BSC).

FIG. 8 illustrates a portion of process 8000 that includes Blending System Controller (BSC) 8003. Process 8000 controls both a quantity metric and a quality metric of a blended fluid in a fluid blending system. FIG. 8 also illustrates examples of potential manipulated variables (MVs), dependent variables (DVs), and controlled variables (CVs) which can be used by the BSC.

The BSC 8003 controls the amount and quality of a fluid in a pool.

The manipulated variables for the controller are as follows:
Direct Gas Manipulations
These manipulated variables can include enrichment fluids, make-up fluids, header transfers or any fluid flow that can be directly manipulated from the BSC. BSC 8003 manipulates these variables directly through line 8105 to the distributed control system.
FMC Consumption Targets
These manipulated variables will manipulate the blended fluid consumption target for FMC 8004. FMC 8004 will then manipulate its manipulated variables to achieve the consumption target. BSC 8003 therefore manipulates the blended fluid consumption indirectly through line 8104 to FMC 8004 and on its turn to the distributed control system 8001.

The disturbance (feed forward) variables for the controller are as follows:
Offgas Flows
These variables include any uncontrolled fluid stream (flow) entering the pool such as a distillation column overhead offgas streams, uncontrolled header transfers, etc.
Uncontrolled consumptions
These variables include an uncontrolled consumption stream leaving the pool such as furnace consumptions, uncontrolled header transfers, etc.
Offgas Qualities
These variables are the quality of any fluid stream, controlled or uncontrolled, entering the blending pool such as distillation column overhead offgas streams, header transfers, etc.

The variable configuration and tuning of BSC 8003 are stored in the BSC Configuration 8006 block.

FMC Controllers.

Figure 9:
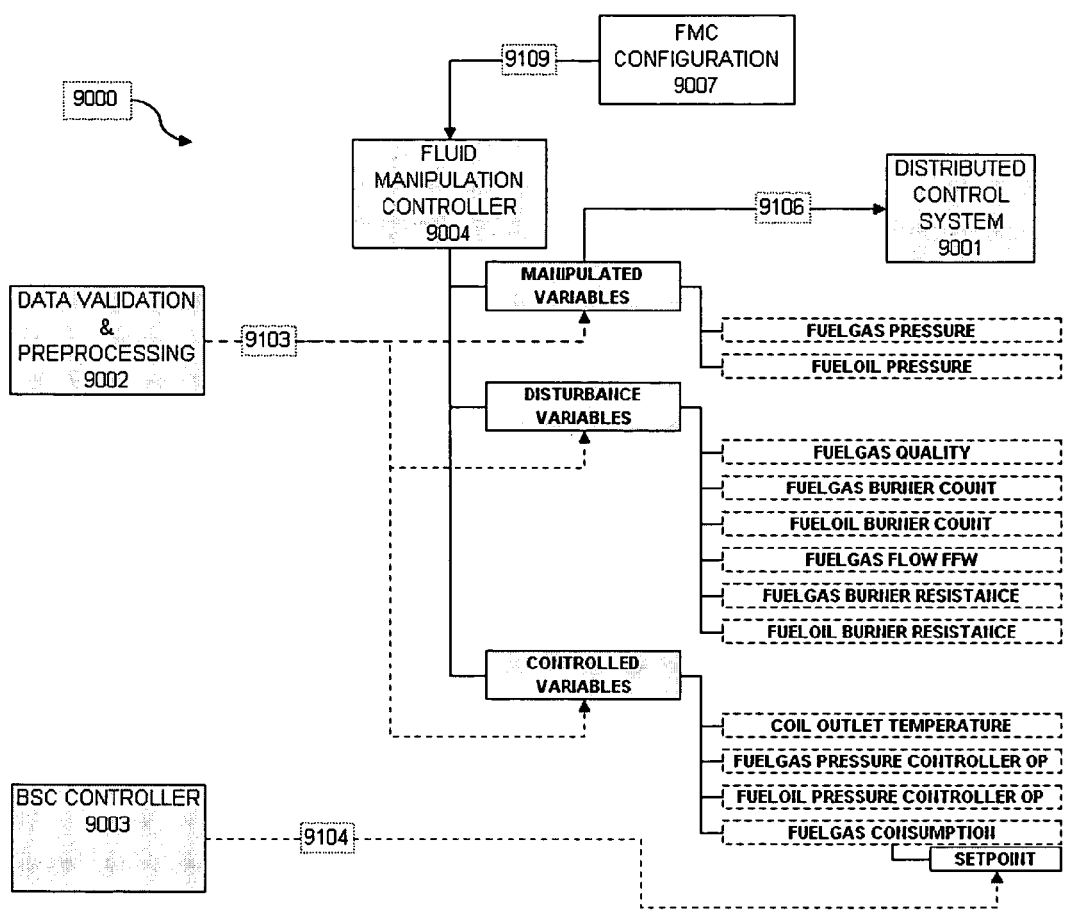
FIG. 9 illustrates a portion of a process embodying the invention which includes a Furnace Manipulation Controller.

FIG. 9 illustrates a portion of process 9000 that includes fluid manipulation controller (FMC) 9004. Process 9000 controls both quantity metric and a quality metric of a blended fluid in a fluid blending system. FIG. 9 also illustrates examples of potential manipulated variables (Mvs), dependent variables (DVs), and controlled variables (CVs) which can be used by FMC 9004.

The purpose of FMC 9004 is to control a specified fluid flow while looking after process specific constraints. FMC Controller 9004 receives a fluid consumption setpoint from BSC 9003 through line 9104 and manipulates its manipulated variables directly through line 9106 to the distributed control system 9001.

The FMC can control any system that consumes a fluid such as dual firing furnaces. In the case of a dual firing furnace, the controlled variables for the FMC can be:
A Coil Outlet Temperature
A Fuel Gas Pressure Controller Output
A Fuel Oil Pressure Controller Output
A Fuel Gas Consumption Setpoint Manipulated by the BSC.

The manipulated variables for the dual firing furnace FMC are as follows:
Fuel Gas Pressure
Fuel Oil Pressure
The disturbance (feed forward) variables for the dual firing furnace FMC are as follows:
Fuel Gas Quality
Fuel Gas Burner Count
Fuel Oil Burner Count
Fuel Gas Flow FFW
Fuel Gas Burner Resistance
Defined as the amount of delta pressure required for one engineering unit fuel gas flow per burner.
Fuel Oil Burner Resistance
Defined as the amount of delta pressure required for one engineering unit fuel oil flow per burner.

The variable configuration and tuning of the FMC are stored in the FMC Configuration 9007 block.

Figure 10:
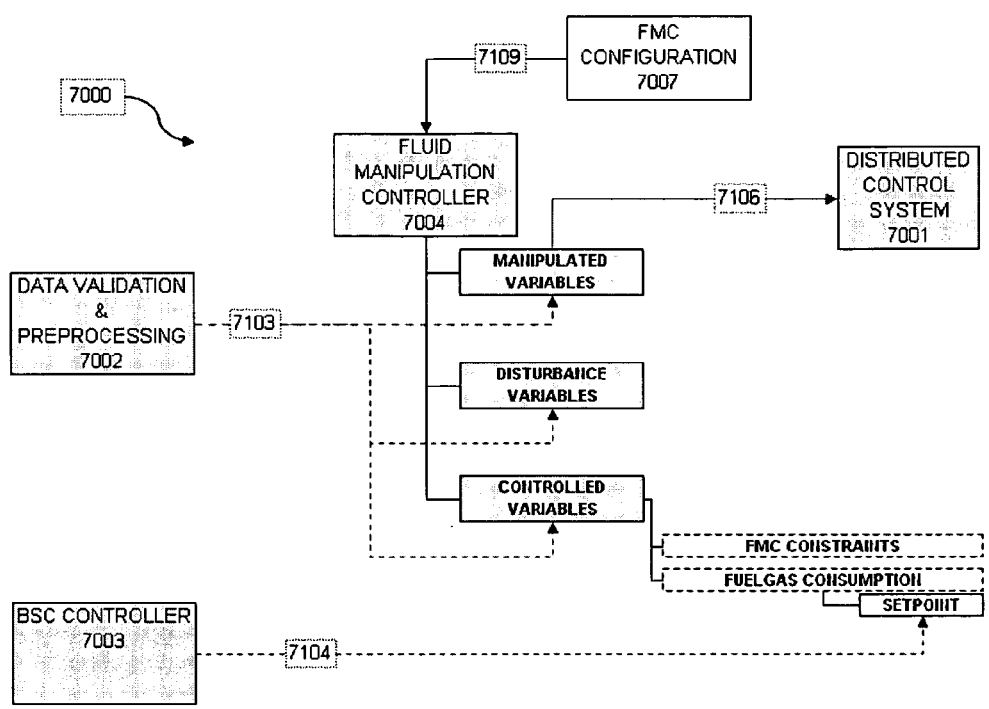
FIG. 10 illustrates a portion of a process that includes a fluid manipulation controller (FMC).

FIG. 10 illustrates a portion of process 7000 that includes fluid manipulation controller (FMC) 7004. Process 7000 controls both a quantity metric and a quality metric of a blended fluid in a fluid blending system. FIG. 10 also illustrates examples of potential controlled variables (CVs) which can be used by FMC 7004.

The purpose of FMC 7004 is to control a specified fluid flow while looking after process specific constraints. FMC 7004 receives a fluid consumption setpoint from BSC 7003 through line 7104, and based upon the FMC constraints and the fuelgas consumption controlled variable, sends information (e.g., a control action or information about the state of the pool system) through line 7106 to distributed control system 7001. Control system 7001 implements a control law based upon the information received from FMC 7004. The variable configuration and tuning of the FMC are stored in the FMC Configuration 7007 block.

General Controller Calculations

Figure 11:
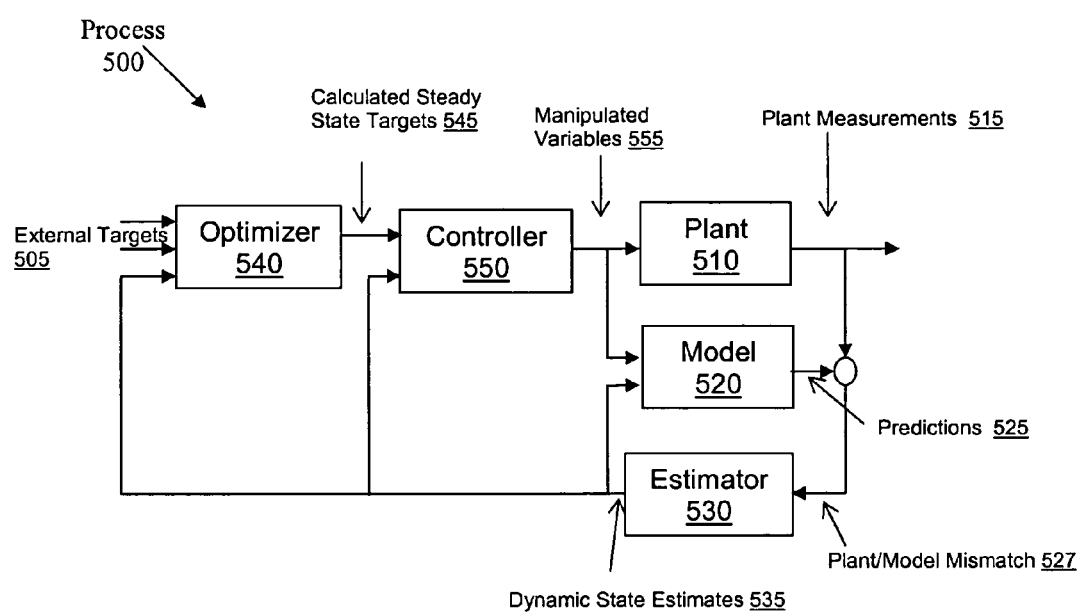
FIG. 11 illustrates a model embedded directly into a nonlinear control law.

The preferred embodiment for the Blending System Controllers and the Fluid Manipulation Controllers is to embed their model equations directly into a nonlinear control law. FIG. 11 illustrates a model embedded directly into a nonlinear control law (i.e., a nonlinear controller). The controller calculations consists of 3 calculation blocks: Estimator 530, Optimizer 540, and Controller 550. The same form of control calculations are used for both the Optimizing Controller and for the Fuel Manipulation Controllers, with the corresponding Plant 510 and Model 520 in the loop.

A description of the controller calculations follow. It will be apparent to those of skill in the art that other control laws can be substitute for the one described below and are encompassed by this invention. For example, other nonlinear control law or gain-adapted linear control law could be substituted for the one described below.

Model

For the purpose of this disclosure, the model equations are assumed to be a set of discrete MISO state space equations of the form $$x(k+1) = Ax(k) + Bu(k-\delta)$$

$$y(k) = g(x(k), u(k-\delta)).$$

The A's, B's and g's, and $\delta$'s are different for each CV, and each CV has an independent set of states. However, none of these are explicitly indexed in order not to overburden the notation. These equations match the form of the FGO and FMC equations described earlier in this disclosure.

The inputs may be Manipulated Variables (MVs) or they may be measured Disturbance Variables (DVs). The outputs are Controlled Variables (CVs).

The $\delta$ are integral dead-times between inputs and the particular output. These could be included as an extra set of states, but it is more efficient to deal with them explicitly.

These model equations give the predicted dynamic response of the plant to a series of inputs. This prediction occurs in the absence of any feedback from the plant.

Estimator

The estimator 530 deals with the issue of unmeasured disturbance and model/plant mismatch. The estimator uses the mismatch 527 between the plant measurements 515 and the model predictions 525 to update estimates of unmeasured disturbance states. The estimator is based on a disturbance model of the system.

Disturbance Models

Disturbance modeling refers to specification of how unmeasured disturbances enter the system, and how they are estimated on line. This is important for achieving offset free control.

An output step disturbance is assumed for each open-loop stable CV. The model form can then be augmented with a disturbance state as follows:

$$\begin{bmatrix} x(k+1) \\ \eta(k+1) \end{bmatrix} = \begin{bmatrix} A & 0 \\ 0 & 1 \end{bmatrix} \begin{bmatrix} x(k) \\ \eta(k) \end{bmatrix} + \begin{bmatrix} B \\ 0 \end{bmatrix}(u(k-\delta)) + \begin{bmatrix} 0 \\ w(k) \end{bmatrix}$$

$$y(k) = g(x(k), u(k-\delta)) + \eta(k) + v(k)$$

where w(k), and v(k) are zero-mean white noise disturbance processes.

In modeling a fluid blending system, only pool pressures are integrating CVs, and these are dynamically modeled as pure ramps—i.e. the A matrix is a 1×1 identity matrix. In addition, the state space model, in this case, is linear. For these pressure models, it is assumed that an unmeasured step disturbance can directly enter this state, but that some of this disturbance is apportioned to the output by means of a factor $0 < \rho < 1$:

$$\begin{bmatrix} x(k+1) \\ \eta(k+1) \end{bmatrix} = \begin{bmatrix} 1 & \gamma \\ 0 & 1 \end{bmatrix} \begin{bmatrix} x(k) \\ \eta(k) \end{bmatrix} + \begin{bmatrix} B \\ 0 \end{bmatrix}(u(k-\delta)) + \begin{bmatrix} 0 \\ w(k) \end{bmatrix}$$

$$y(k) = c^T \left( x(k) + \frac{1}{\gamma}\eta(k) \right) + v(k)$$

$$\gamma = \frac{\rho}{1-\rho}$$

These augmented stochastic model are used for estimating the unmeasured disturbances $\eta(k)$ using an Extended Kalman Filter estimator.

Estimator

The purpose of the Estimator 530 is to dynamically reconcile the models with plant measurements and thus achieve offset free control. In the preferred embodiment, the estimation is achieved using a standard Extended Kalman Filter operating on the models augmented with disturbance states.

The filter equations below assume that the state equations have been augmented to include the disturbance states, where a + subscript is used to indicated the augmented model. i.e.

$$x^+ \equiv \begin{bmatrix} x \\ \eta \end{bmatrix}, \quad A^+ \equiv \begin{cases} \begin{bmatrix} A & 0 \\ 0 & 1 \end{bmatrix} & \text{stable} \\ \begin{bmatrix} 1 & \gamma \\ 0 & 1 \end{bmatrix} & \text{unstable} \end{cases}$$

etc.

There are five steps to the Extended Kalman Filter calculation which are well known to those skilled in the art:

State Estimate Time Update $$x^+_{k|k-1} = A^+ x^+_{k-1|k-1} + B^+ u_{k-1}$$

Covariance Estimate Time Update $$P_{k|k-1} = A^+ P_{k-1|k-1}(A^+)^T + Q_k$$

where $Q_k$ is the expected value of the system noise w(k)

Filter Gain Measurement Update $$K_k = P_{k|k-1}(C_k^+)^T[(C_k^+)P_{k|k-1}(C_k^+)^T + R_k]^{-1}$$

where $$(C_k^+) = \frac{\partial g^+}{\partial x}\bigg|_{\hat{x}_{i|i-1}, u_{i-1}}$$

and $R_k$ is the expected value of the system noise v(k).

State Estimate Measurement Update $$\hat{x}_{k|k} = \hat{x}_{k|k-1} + K_k(y_k - g^+(\hat{x}_{k|k-1}, \check{u}_{k-}))$$

Covariance Estimate Update $$P_{k|k} = (I - K_k C_k^+)P_{k|k-1}(I - K_k C_k^+)^T + K_k R_k K_k^T$$

The input $\check{u}_{k_-}$ refers to the input read just prior to the filter calculation; under zero-order hold assumption, this is simply the input at the previous time step:

$$\check{u}_{i_-} = u_{i-1}$$

Optimizer

The purpose of the Optimizer 540 is to provide an optimal set of targets for the controller move plan that:
  (a) Satisfy the steady state conditions
  (b) Satisfy operating constraints
  (c) Are optimal with respect to ideal operating points The augmented model is used to specify the steady state conditions under the assumption that the estimated disturbance state at the time of the calculation will stay constant over the time to steady state. In order to describe the optimization that occurs, the following notation is used:

CV Operating Limits

Lower and upper operating limits are denoted by $\check{y}$ and $\hat{y}$ respectively.

Constraint Handling for CV Operating Limits

Operating Limit infeasibility for CVs can be handled using $l_1/l_2$ ("exact") penalty treatment, in which each slack variable has a linear and quadratic penalty term, the linear term ensuring the constraints are exactly met if possible. Slacks are denoted by $\epsilon_t$. Each deviation is measured by $\epsilon_t + 0.5\epsilon_t^2$, which is penalized by a large weighting parameter denoted by $t_{SS}$.

MV Operating Limits

Lower and upper operating limits are denoted by $\check{u}$ and $\hat{u}$ respectively.

Move Limit

The MV move limit restricts how far the steady state solution for a given MV may deviate from its current value $u_0$. This move limit is restricted to be less then the total dynamic move capability. The lower and upper move limit vectors are denoted by $\Delta\check{u}_{SS}$ and $\Delta\hat{u}_{SS}$.

Ideal Resting Value

Ideal Steady State Resting Values $v^{IRV}$ can be specified for variables (Independent or Dependent) in the model.

Optimization Problem
Minimize $$\Psi = \Psi^{IRV} + \Psi^{CV\ OperatingLimit} + \Psi^{SteadyState}$$

subject to constraints:

$$-\epsilon_z \leq (A^+ - I)x^+ + Bu^+ \leq \epsilon_z$$

$$y = g^+(x^+, u) \quad \text{(Steady state constraints)}$$

$$\check{u} \leq u \leq \hat{u} \quad \text{(Operating limits, independent variables)}$$

$$u_0 + \Delta\check{u} \leq u \leq u_0 + \Delta\hat{u} \quad \text{(Step limits)}$$

$$v^{IRV} \leq v + \epsilon_q$$

$$v^{IRV} \geq v - \epsilon_q \quad \text{(Ideal Resting Value Constraints)}$$

$$\check{y} \leq y + \epsilon_t$$

$$\hat{y} \geq y - \epsilon_t \quad \text{(Operating limits, dependent variables)}$$

$$\epsilon_q \geq 0$$

$$\epsilon_t \geq 0$$

$$\epsilon_z \geq 0 \quad \text{(Slack variable constraints)}$$

where $$\Psi^{IRV} = (0.5\epsilon_q^T Q^{IRV}\epsilon_q + (q^{IRV})^T \epsilon_q)$$

$$\Psi^{CVOPeratingLimit} = (0.5\epsilon_t^T T_{SS}\epsilon_t + t_{SS}^T \epsilon_t)$$

$$\Psi^{SteadyState} = (0.5\epsilon_z^T Z_{SS}\epsilon_z + z_{SS}^T \epsilon_z)$$

This optimization problem can be solved using a standard quadratic program (SQP) code, known to those skilled in the art. In addition, the constraints can optionally be ranked so that the problem is solved as a series of sub-problems. In each sub-problem only the constraints ranked above a certain level are imposed. Once feasibility has been established (with non-zero slacks if give-up is necessary), these slacks are imposed as hard constraints in later sub-problems. This scheme allows critical constraints to be met exactly at the expense of lower ranked constraints.

Controller

The controller 550 calculates an optimal move plan based on objectives along a predictive horizon. The aim is to be at steady state at the end of the horizon based on the predictions of the reconciled models. Only the first move is implemented in the plant, and the optimization problem is solved again at the next controller cycle. This general scheme is well known to those skilled in the art and is referred to as Model Predictive Control.

Notation

The current input, estimated augmented state, and estimated output are denoted by $u_0$, $x^+_0$, and $y_0$ respectively. Disturbance states and feedforward states are assumed to be constant along the horizon that is used to calculate the move plan. The values along horizon are designated by $u_1$, $u_2, \ldots, x_1, x_2, \ldots,$ and $y_1, y_2, \ldots$ The notation $\Delta u_p \equiv u_p - u_{p-1}$ denotes the delta move at the current horizon point.

Let $u^*$, $x^*$, $y^*$ denote the consistent targets from the Optimizer 540.

Let $u_1^*, u_2^*, \ldots,$ and $y_1^*, y_2^*, \ldots$ denote a desired reference trajectory.

Deviations from the reference trajectories are represented as, $\hat{u}_p = u_p - u_p^*$, $\hat{y}_p = y_p - y_p^*$.

Coincident Points

The move plan objective allows CV errors from the reference trajectory to be penalized only at certain points, referred to as coincident points. These are also the points where operating constraints are enforced. Let P denote the number of coincident points for a given CV. Let $\pi(1)$, $\pi(2), \ldots$ denote the mapping from the $p^{th}$ coincident point to the corresponding point in the prediction horizon.

Move Points

The move plan objective will allows $\Delta u_p$ to be restricted to be non-zero only at certain points ("move points") along the horizon. In addition, these points represent the points at which deviation from the MV reference trajectory is penalized and at which MV operating constraints are enforced. Let L denote the number of move points, and let $\lambda(1)$, $\lambda(2), \ldots$ denote the mapping from the $l^{th}$ move point to the corresponding point in the move horizon. The first point on the horizon is forced to be a move point CV Penalty Weights Penalty weights for deviation of a CVs from their reference trajectory are denoted by $q_1, q_2, \ldots$, and denote $Q_p = \text{diag}(q_p)$.

MV Penalty Weights

Penalty weights for deviation of an MV variable from its reference trajectory are denoted by $r_1, r_2, \ldots$, and denote $R_p = \text{diag}(r_p)$.

Step Suppression Weight

Step suppression weights, which weight quadratic delta MV penalties across the horizon are denoted by $s_1, s_2, \ldots$, and denote $S_p = \text{diag}(s_p)$.

Operating Limits

Lower operating limits for MVs and CVs are denoted by $\check{u}_1, \check{u}_2, \ldots$, and $\check{y}_1, \check{y}_2, \ldots$ respectively. Upper operating limits for MVs and CVs are denoted by $\hat{u}_1, \hat{u}_2, \ldots$, and $\hat{y}_1, \hat{y}_2, \ldots$ respectively.

Step Limits

Lower and upper step limits are denoted by $\Delta\check{u}_1, \Delta\check{u}_2, \ldots$ and $\Delta\hat{u}_1, \Delta\hat{u}_2, \ldots$.

Constraint Handling

Infeasibility for CVs is handled using $l_1/l_2$ ("exact") penalty treatment, in which each slack variable has a linear and quadratic penalty term, the linear term ensuring the constraints are exactly met if possible. The advantage of using exact penalty treatment is that the stability properties of the constrained controller are identical to those of the unconstrained controller.

The notation for CV slack variables along the path is $\epsilon_1, \epsilon_2, \ldots$. Each deviation metric is of the form $\epsilon_p + 0.5\epsilon_p^2$, and has a penalty weight denoted by $t_1, t_2, \ldots$. Denote by $t_1, t_2, \ldots$ the vector versions of these (representing the vector of CVs), and denote $T_p = \text{diag}(t_p)$.

Objective Function

The path optimizer is performing a constrained minimization of an objective function. The objective function depends on configuration and tuning parameters that the engineer or operator sets, as well as on steady targets that come from a target optimization.

Minimize $$\Phi = \Phi^{CV\ Penalty} + \Phi^{CV\ Constraint\ Handling} + \Phi^{MV\ Penalty} + \Phi^{Step\ Suppression}$$

subject to constraints (again noting that the A, B, g, etc are different for different CVs):

$$x^+_{p+1} = A^+ x^+_p + B u_{p-\delta}$$

$$y_p = g^+(x^+_p, u_{p-\delta}) \quad \text{(Model constraints)}$$

$$\check{u}_{\lambda(l)} \leq u_{\lambda(l)} \leq \hat{u}_{\lambda(l)} \quad \text{(MV Operating limits)}$$

$$\Delta\check{u}_{\lambda(l)} \leq \Delta u_{\lambda(l)} \leq \Delta\hat{u}_{\lambda(l)} \quad \text{(MV Step limits)}$$

$$\check{y}_{\pi(p)} - \epsilon \leq y_{\pi(p)} \leq \hat{y}_{\pi(p)} + \epsilon\ 1 \leq p < P \quad \text{(CV Operating limits)}$$

$$\epsilon \geq 0 \quad \text{(Slack Variable constraints)}$$

where:

$$\Phi^{CV\ Penalty} = 0.5 \sum_{p=1}^{P-1} \hat{y}_{\pi(p)}^T Q_{\pi(p)} \hat{y}_{\pi(p)}$$

-continued $$\Phi^{CV\ Constraint\ Handling} = (0.5\epsilon^T T\epsilon + t^T \epsilon) + (0.5\epsilon_{\pi(p)}^T T_{\pi(p)} \epsilon_{\pi(p)} + t_{\pi(P)}^T \epsilon_{\pi(p)})$$

$$\Phi^{MV\ Penalty} = 0.5 \sum_{l=1}^{L} \hat{u}_{\lambda(l)}^T R_{\lambda(l)} \hat{u}_{\lambda(l)}$$

$$\Phi^{Step\ Suppression} = 0.5 \sum_{l=1}^{L} \Delta u_{\lambda(l)}^T S_{\lambda(l)} \Delta u_{\lambda(l)}$$

Solver

In the preferred embodiment, a Multi-step Newton-type algorithm is used to solve this optimization problem. A description can be found in Li, W. C. & Biegler, L. T. "Multistep, Newton-type control strategies for constrained nonlinear processes" (*Chemical Engineering Research Design*, 67, 562–577) and Oliveira, N. M. C. & Biegler, L. T. "An Extension of Newton-type algorithms for nonlinear process control" (*Automatica*, 31(2), 281–286). All constraint and objective derivatives are calculated analytically.

Figure 12:
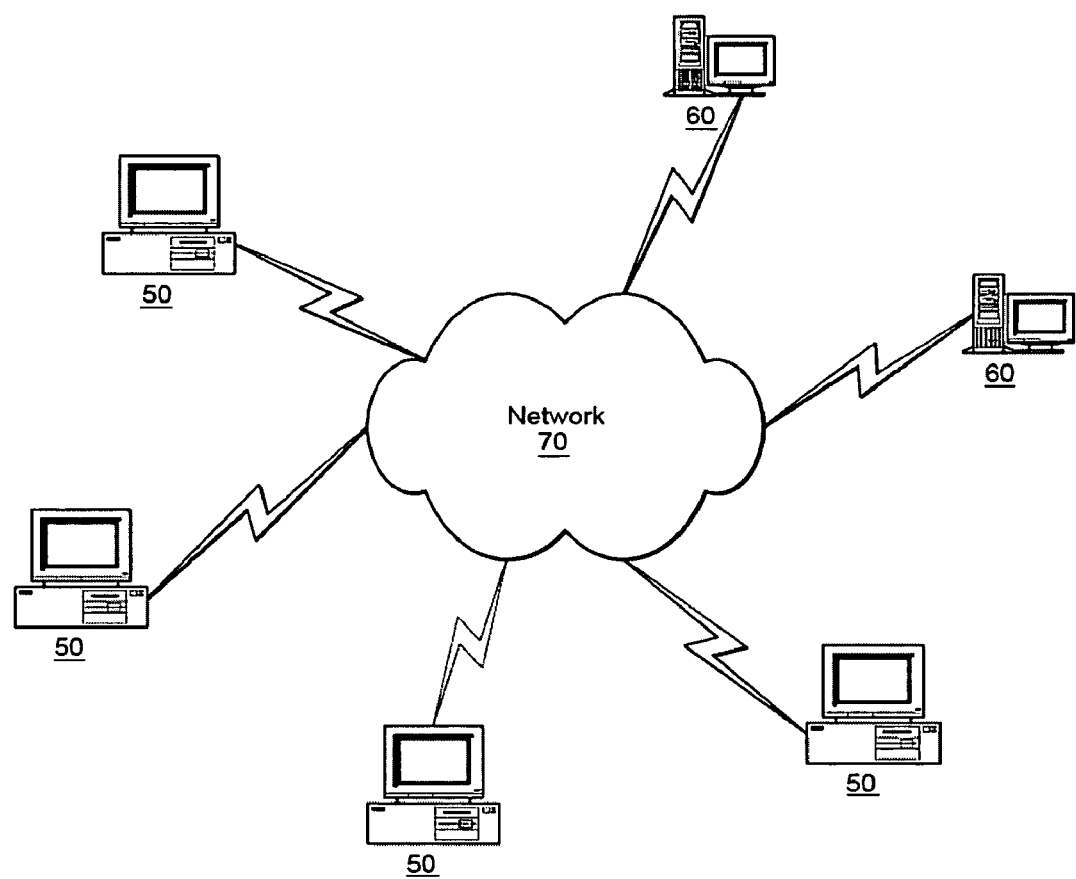
FIG. 12 illustrates an embodiment of the invention that features a computer implementation of a method of controlling or stabilizing both the volume and a quality metric of a fluid in a fluid blending system.

The present invention also includes computer implementations of the methods of controlling or stabilizing both a quantity metric and a quality metric of a fluid of a fluid blending system. FIG. 12 illustrates one embodiment of such a computer implementation. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the methods are implemented on a stand-alone computer.

Figure 13:
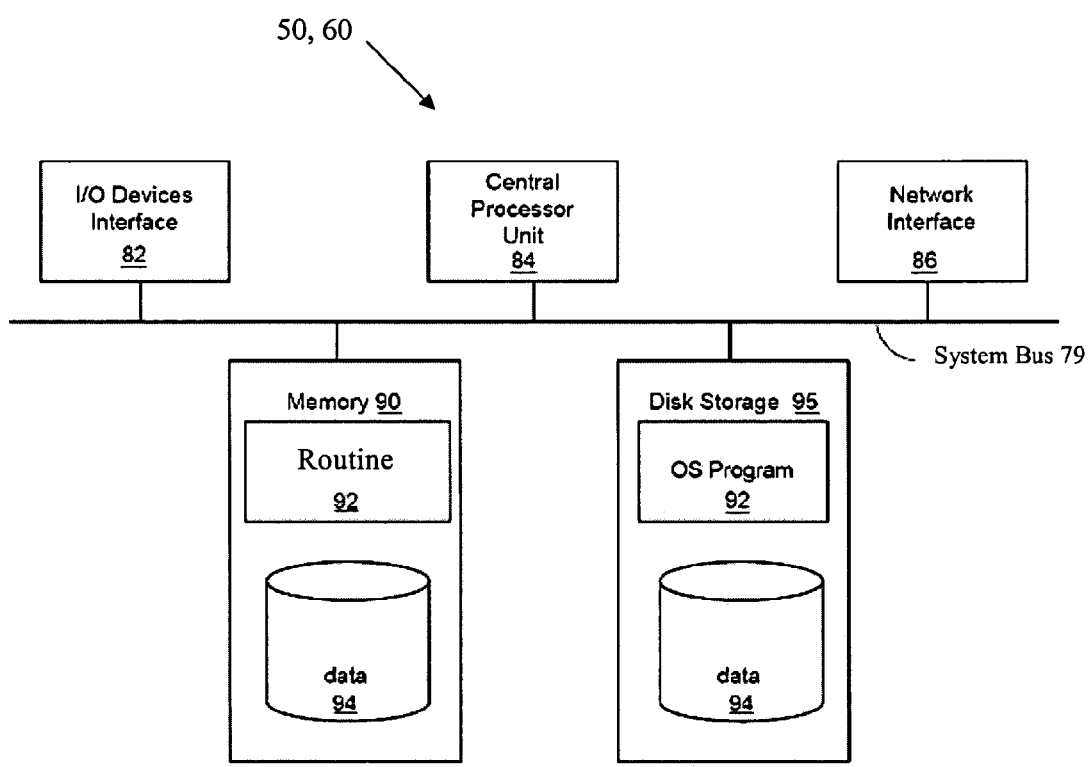
FIG. 13 illustrates a diagram of the internal structure of a computer implementation of a method of controlling or stabilizing both the volume and a quality metric of a fluid in a fluid blending system.

FIG. 13 is a diagram of the internal structure of a computer (e.g., client computer(s) 50 or server computers 60) in the computer system of FIG. 12. Each computer contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 12). Memory 90 provides volatile storage for computer software instructions used to implement an embodiment of the present invention (e.g., Program Routines 92 and Data 94, such as Process 1000). Disk storage 95 provides non-volatile storage for computer software instructions and data used to implement an embodiment of the present invention. Central processor unit 84 is also attached to system bus 79 and provides for the execution of computer instructions.

Figure 14:
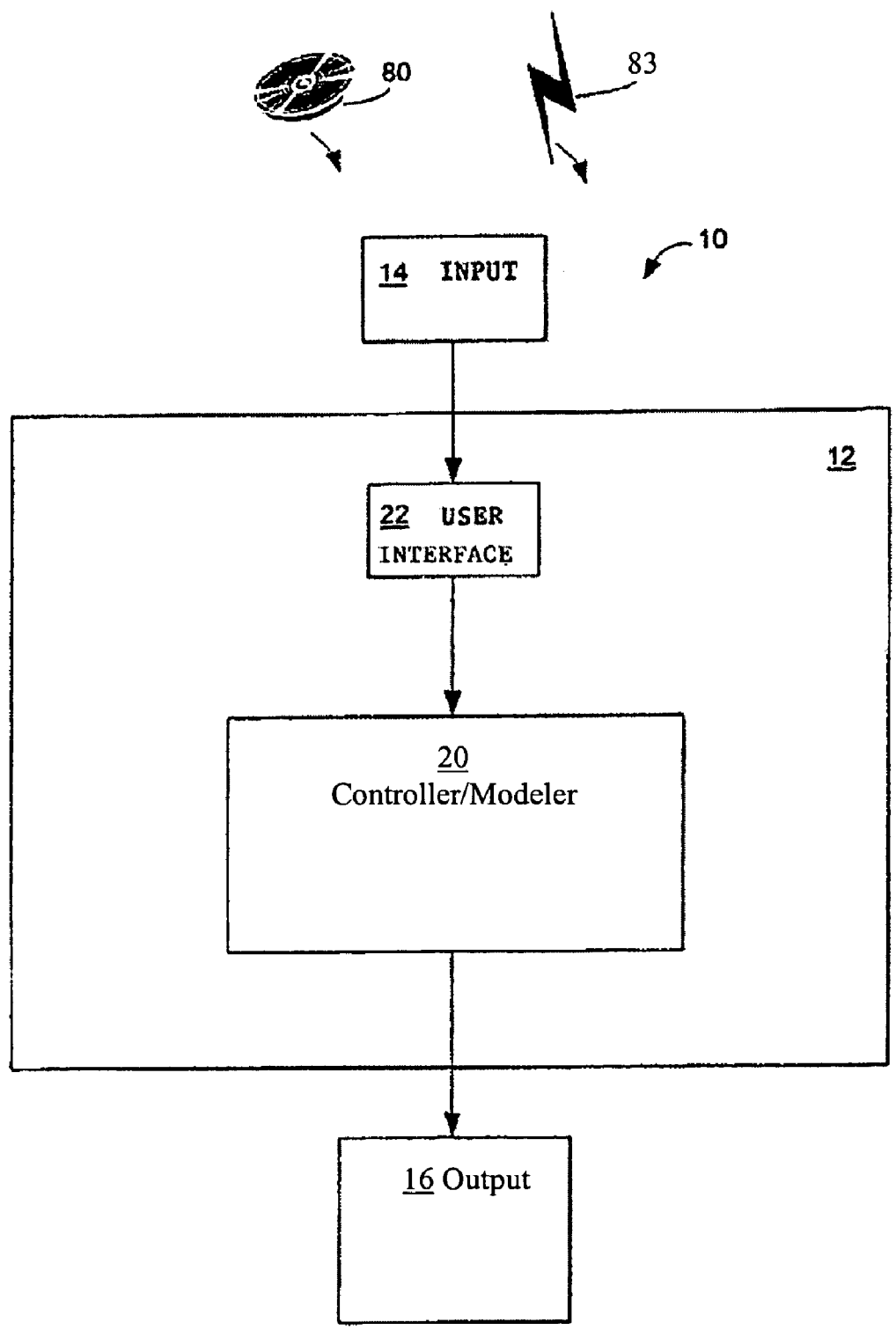
FIG. 14, illustrated an embodiment of the invention that includes computer systems implementing methods of the present invention.

Referring now to FIG. 14, illustrated is another computer system 10 embodying the present invention methods mentioned above. Generally, computer system 10 includes digital processor 12 which hosts and executes controller 20. Controller 20 comprises a method of stabilizing both the volume and a quality metric of a fluid blending system and implements process 1000 of FIG. 1. Input means 14 provides user selectable/definable data (e.g., data relating to, or useful for, defining or characterizing the flow of a stream of gas or gasses entering or leaving a fluid blending system, or data relating to, or useful for, defining or characterizing manipulated and/or controlled variables) from a user of computer system 10 and/or direct or indirect measurements of the flow of a stream of gas or gasses entering or leaving a fluid blending system. Input means 14 can be implemented as any of various in-put/out-put devices, programs, or routines coupled to computer system 10.

Responsive to input means 14 is user interface 22. User interface 22 receives user input data from input means 14 and provides input data for processing by controller/modeler 20. Controller/modeler 20 implements the methods of the invention in order to determine a suitable controller action to control both the volume and a quality metric of a fluid blending system. Controller/modeler 20 further outputs one or more control actions to a user and/or a process control device. As such, output 16 is a control action derived from input 14.

In one embodiment, computer program product 80, including a computer readable medium (e.g., a removable storage medium such as one or more DVD-ROM's, CD-ROM's, diskettes, tapes, etc.) provides at least a portion of the software instructions for controller/modeler 20, user interface 22, and/or any of component of controller/modeler 20 or user interface 22. Computer program product 80 can be installed by any suitable software installation procedure, as is well known in the art. In another embodiment, at least a portion of the software instructions may also be downloaded over a wireless connection. Computer program propagated signal product 83 embodied on a propagated signal on a propagation medium (e.g., a radio wave, an infrared wave, a laser wave, a sound wave, or an electrical wave propagated over a global network such as the Internet, or other network(s)) provides at least a portion of the software instructions for controller/modeler 20, user interface 22, and/or any component of controller/modeler 20 or user interface 22.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 80 is a propagation medium that the computer system 10 may receive and read, such as by receiving the propagation medium and identifying a propagated signal embodied in the propagation medium, as described above for computer program propagated signal product 83.

What is claimed is:

1. A method of controlling a fluid blending system, wherein the fluid blending system distributes a blended fluid, comprising the step of nearly simultaneously controlling both a quantity metric and a quality metric of the blended fluid within the fluid blending system using a non-linear fluid blending model.

2. A method of controlling a fluid blending system, wherein the fluid blending system includes at least one fluid supply stream directing a fluid into the fluid blending system, at least one consumption stream directing a blended fluid out of the fluid blending system, the method comprising the steps of:
   a) determining at least one quality metric of a fluid in the supply stream and at least one flow rate of fluid in a supply or consumption stream;
   b) using a non-linear model to determine a quality metric of the blended fluid in the system and flow rate imbalances; and
   c) using at least one manipulated variable to simultaneously control at least one quantity metric and at least one quality metric of the blended fluid, thereby controlling the fluid blending system.

3. The method of claim 2, wherein the quality metric of fluid in the supply stream is determined using first principle calculations or an empirical model.

4. The method of claim 2, wherein the non-linear model is based upon rigorous equations, an empirical model, or a Bounded Derivative Network.

5. The method of claim 2, wherein the non-linear model is embedded in a non-linear model predictive controller.

6. The method of claim 2, wherein the non-linear model is used to adapt steady state gains of a linear model predictive controller.

7. The method of claim 2, wherein the non-linear model is a non-linear fluid blending model or a non-linear furnace model.

8. The method of claim 2, wherein the non-linear model includes at least one variable gain that can be a negative value, a positive value, or zero.

9. The method of claim 8, wherein the gain varies linearly with variations in a quality metric of a fluid in the supply stream.

10. The method of claim 2, wherein the non-linear model includes at least two independent feed forward variables for every supply stream.

11. The method of claim 2, wherein the non-linear model uses a determined flow rate and quality metric for each supply stream as input variables.

12. The method of claim 2, wherein the quality metric of at least one supply stream is determined by assigning the quality metric a nominal quality value.

13. The method of claim 2, further including a step of creating the manipulated variable or a controlled variable, thereby providing a number of degrees of freedom sufficient for controlling the fluid blending system.

14. The method of claim 13, wherein the manipulated variable or controlled variable is created by controlling a flow rate of a supply or consumption stream.

15. The method of claim 2, wherein the non-linear model is calculated using blending rule calculations.

16. The method of claim 2, wherein the fluid blending system is a steam distribution system, a hydrogen distribution system, a refinery fuel blending system, or a fluid utility distribution system.

17. The method of claim 16, wherein the fluid blending system is a fluid utility distribution system and the blended fluid includes fuel gas.

18. The method of claim 17, wherein the quality metric of fluid in a supply stream is determined using first principle calculations or an empirical model.

19. The method of claim 17, wherein the non-linear model is based upon rigorous equations, an empirical model, or a Bounded Derivative Network.

20. The method of claim 17, wherein the non-linear model is embedded in a non-linear model predictive controller.

21. The method of claim 17, wherein the non-linear model is used to adapt steady state gains of a linear model predictive controller.

22. The method of claim 17, wherein the non-linear model is a non-linear fluid blending model or a non-linear furnace model.

23. The method of claim 17, wherein the non-linear model includes at least one variable gain that can be a negative value, a positive value, or zero.

24. The method of claim 23, wherein the gain varies linearly with variations in a quality metric of a fluid in the supply stream.

25. The method of claim 17, wherein the non-linear model includes at least two independent feed forward variables for every supply stream.

26. The method of claim 17, wherein the non-linear model uses a determined flow rates and quality metric for each supply stream as input variables.

27. The method of claim 17, wherein the quality metric of at least one supply stream is determined by assigning the quality metric a nominal quality value.

28. The method of claim 17, further including a step of creating the manipulated variable or a controlled variable, thereby providing a number of degrees of freedom sufficient for controlling the fluid blending system.

29. The method of claim 28, wherein the manipulated variable or control variable is created by controlling a flow rate of a supply or consumption stream.

30. The method of claim 28, wherein the manipulated variable or control variable is created by controlling a distribution of fuel gas between more than one fuel gas header system.

31. The method of claim 17, wherein the non-linear model is calculated using blending rule calculations.

32. A computer program product, comprising:
   a) a computer usable medium; and
   b) a set of computer program instructions embodied on the computer useable medium for controlling a fluid blending system, wherein the fluid blending system using a non-linear fluid blending model distributes a fluid, comprising the step of nearly simultaneously controlling both a quantity metric and a quality metric of the fluid of the fluid blending system.

33. The computer program of claim 32, wherein at least some portion of the computer program instructions include instructions to request data or request instructions over a telecommunications network.

34. The computer program of claim 32, wherein at least some portion of the computer program is transmitted over a global network.

35. The computer program of claim 32, wherein the computer usable medium includes a removable storage medium.

36. The computer program of claim 35, wherein the removable storage medium includes any of a CD-ROM, a DVD-ROM, a diskette, and a tape.

37. A computer system to control a fluid blending system, the computer system comprising:
   a) a data transfer means for transferring data among components of a computer; and
   b) a controller coupled to receive input from the data transfer means, wherein the controller nearly simultaneously controls both a quantity metric and a quality metric of a blended fluid that is distributed through the fluid blending system using a non-linear fluid blending model.

38. The computer system of claim 37, wherein the controller includes:
   i) a controller means for calculating a control signal based upon a flow rate and a quality metric for at least one supply or consumption stream, wherein implementation of the control signal results in the blended fluid having an acceptable quality metric and the fluid blending system having an acceptable amount of blended fluid; and
   ii) a flow manipulation means in communication with the controller means, wherein the flow manipulation means implements the control signals of the controller means.

39. A control system that simultaneously controls a quantity metric and a quality metric of a fluid in a fluid blending system, wherein the fluid blending system includes at least one fluid supply stream entering the fluid blending system, at least one means for blending the fluid, and at least one blended fluid consumption stream leaving the fluid blending system, the control system comprising:
   a) a controller means for calculating a control signal based upon a flow rate and a quality metric for at least one supply or consumption stream using a non-linear fluid blending model, wherein implementation of the control signal results in the blended fluid having an acceptable quality metric and an acceptable quantity metric; and
   b) a flow manipulation means in communication with the controller means, wherein the flow manipulation means implements the control signals of the controller means.

40. The control system of claim 39, further including a quality determination means in communication with the controller means, wherein the quality determination means determines at least one quality metric of a fluid in at least one supply stream.

41. The control system of claim 40, wherein the quality determination means determines the quality metric using first principle calculations or an empirical model.

42. The control system of claim 40, wherein the quality determination means includes at least one online hardware analyzer.

43. The control system of claim 39, wherein the non-linear fluid blending model uses flow rate and quality metric data to calculate the quality of the blended fluid and flow rate data to calculate imbalance in the flow rates of the supply and consumption streams.

44. The control system of claim 43, wherein the non-linear fluid blending model is based upon rigorous equations or an empirical model.

45. The control system of claim 44, wherein the non-linear fluid blending model is based upon a Bounded Derivative Network.

46. The control system of claim 43, wherein the non-linear fluid blending model is embedded in a non-linear model predictive controller.

47. The control system of claim 43, wherein the non-linear fluid blending model is used to adapt steady state gains of a linear model predictive controller.

48. The control system of claim 39, wherein the blended fluid includes fuel gas and the fluid blending system is a fuel gas distribution system.

49. The control system of claim 39, wherein the blended fluid includes steam and the fluid blending system is a steam distribution system.

50. The control system of claim 39, wherein the blended fluid includes hydrogen and the fluid blending system is a hydrogen distribution system.

51. The control system of claim 39, wherein the blended fluid includes gasoline, diesel, or fuel oil and the fluid blending system is a refinery fuel blender.

52. The control system of claim 48, wherein the quality metric is a calorific value.

53. The control system of claim 48, wherein the flow manipulation means includes a non-linear furnace model that calculates fuel gas consumption and furnace coil outlet temperature based on fuel gas quality, burner counts, and fuel gas and alternative fuel flow controller set points.

54. The control system of claim 53, wherein the non-linear furnace model is based on rigorous equations or an empirical model.

55. The control system of claim 54, wherein the non-linear furnace model is based upon a Bounded Derivative Network.

56. The control system of claim 54, wherein the non-linear furnace model is embedded directly into anon-linear model predictive controller.

57. The control system of claim 54, wherein the non-linear furnace model is used to adapt steady state gains of a linear model predictive controller.

58. The method of claim 1, wherein the non-linear model uses flow rate and quality metric data to calculate the quality of the blended fluid and flow rate data to calculate imbalance in the flow rates of the supply and consumption streams.

59. The computer program product of claim 32, wherein the non-linear model uses flow rate and quality metric data to calculate the quality of the blended fluid and flow rate data to calculate imbalance in the flow rates of the supply and consumption streams.

60. The computer system of claim 37, wherein the non-linear model uses flow rate and quality metric data to calculate the quality of the blended fluid and flow rate data to calculate imbalance in the flow rates of the supply and consumption streams.

* * * * *